United States Patent
Weinzierl et al.

(10) Patent No.: US 10,598,119 B2
(45) Date of Patent: Mar. 24, 2020

(54) AERO COMPRESSION COMBUSTION DRIVE ASSEMBLY CONTROL SYSTEM

(71) Applicant: Engineered Propulsion Systems, Inc., New Richmond, WI (US)

(72) Inventors: Steven M. Weinzierl, New Richmond, WI (US); Michael J. Fuchs, New Richmond, WI (US); Alexander Seybold-Epting, Stralsund (DE)

(73) Assignee: Engineered Propulsion Systems, Inc., New Richmond, WI (US)

( * ) Notice: Subject to any disclaimer, the term of this patent is extended or adjusted under 35 U.S.C. 154(b) by 262 days.

(21) Appl. No.: 15/422,613

(22) Filed: Feb. 2, 2017

(65) Prior Publication Data
US 2017/0145945 A1 May 25, 2017

Related U.S. Application Data

(63) Continuation of application No. 13/646,576, filed on Oct. 5, 2012, now Pat. No. 9,611,790.
(Continued)

(51) Int. Cl.
*F02D 41/40* (2006.01)
*F02C 9/26* (2006.01)
(Continued)

(52) U.S. Cl.
CPC .......... *F02D 41/402* (2013.01); *B64D 27/04* (2013.01); *B64D 31/06* (2013.01); *F02C 9/26* (2013.01);
(Continued)

(58) Field of Classification Search
CPC .. F02D 41/402; F02D 35/023; F02D 41/0025; F02D 41/0007; F02D 41/0085;
(Continued)

(56) References Cited

U.S. PATENT DOCUMENTS

| 4,397,285 A | 8/1983 | O'Neill |
| 5,775,273 A * | 7/1998 | Beale ...................... F02B 71/00 |
| | | 123/46 B |

(Continued)

FOREIGN PATENT DOCUMENTS

| CN | 1977099 A | 6/2007 |
| CN | 102052183 A | 5/2011 |

(Continued)

OTHER PUBLICATIONS

Office Action dated Sep. 13, 2018 for Canadian Application No. 2,853,748, 3 pages.
(Continued)

*Primary Examiner* — Phutthiwat Wongwian
*Assistant Examiner* — Susan E Scharpf
(74) *Attorney, Agent, or Firm* — Patterson Thuente Pedersen, P.A.

(57) ABSTRACT

A control system for an aero compression combustion drive assembly, the aero compression combustion drive assembly having an engine member, a transmission member and a propeller member, the control system including a sensor for sensing a pressure parameter in each of a plurality of compression chambers of the engine member, the sensor for providing the sensed pressure parameter to a control system device, the control system device having a plurality of control programs for effecting selected engine control and the control system device acting on the sensed pressure parameter to effect a control strategy in the engine member A control method is further included.

14 Claims, 31 Drawing Sheets

Related U.S. Application Data

(60) Provisional application No. 61/543,624, filed on Oct. 5, 2011.

(51) Int. Cl.
*F02D 35/02* (2006.01)
*F02D 41/00* (2006.01)
*B64D 27/04* (2006.01)
*B64D 31/06* (2006.01)
*F02D 41/28* (2006.01)

(52) U.S. Cl.
CPC ....... *F02D 35/023* (2013.01); *F02D 41/0025* (2013.01); *F02D 41/0007* (2013.01); *F02D 41/0085* (2013.01); *F02D 41/40* (2013.01); *F02D 41/403* (2013.01); *F02D 41/405* (2013.01); *F02D 2041/288* (2013.01); *Y02T 10/44* (2013.01)

(58) Field of Classification Search
CPC ...... F02D 41/40; F02D 41/403; F02D 41/405; F02D 2041/288; F02C 9/26; B64D 27/04; B64D 31/06; B64D 27/00; B64D 31/00; Y02T 10/44
USPC .......................................... 123/319; 701/111
See application file for complete search history.

(56) References Cited

U.S. PATENT DOCUMENTS

| | | | | |
|---|---|---|---|---|
| 6,035,637 | A * | 3/2000 | Beale | F02B 71/00 417/364 |
| 6,138,504 | A * | 10/2000 | Lewis | F02D 41/0072 73/114.33 |
| 6,224,021 | B1 | 5/2001 | Tanaka | |
| 6,234,012 | B1 * | 5/2001 | Lewis | F02D 41/0072 73/114.25 |
| 6,340,289 | B1 | 1/2002 | Vos et al. | |
| 6,820,597 | B1 * | 11/2004 | Cullen | F02D 17/02 123/516 |
| 7,174,879 | B1 * | 2/2007 | Chol | F02D 31/002 123/406.11 |
| 2002/0066445 | A1 | 6/2002 | Thomas | |
| 2003/0167139 | A1 * | 9/2003 | Swartz | G01R 31/001 702/65 |
| 2004/0237514 | A1 * | 12/2004 | Surnilla | F02D 17/02 60/299 |
| 2005/0022789 | A1 | 2/2005 | Palma et al. | |
| 2005/0039721 | A1 | 2/2005 | Truscott et al. | |
| 2005/0125140 | A1 | 6/2005 | Vermonet et al. | |
| 2007/0227492 | A1 * | 10/2007 | Cheiky | F02B 31/00 123/304 |
| 2008/0078167 | A1 * | 4/2008 | Wang | F01N 3/00 60/285 |
| 2008/0147295 | A1 | 6/2008 | Sivasubramaniam et al. | |
| 2008/0243352 | A1 | 10/2008 | Healy | |
| 2008/0276897 | A1 * | 11/2008 | Petridis | F02D 41/3041 123/192.2 |
| 2009/0266336 | A1 | 10/2009 | Morimoto et al. | |
| 2010/0064689 | A1 * | 3/2010 | Reinhardt | B64D 27/24 60/706 |
| 2010/0180576 | A1 * | 7/2010 | Wang | F01N 3/2066 60/276 |
| 2011/0106399 | A1 | 5/2011 | Asano et al. | |
| 2011/0238283 | A1 | 9/2011 | Miersch-Wiemers et al. | |
| 2014/0069371 | A1 * | 3/2014 | Berkemeier | F02M 39/00 123/294 |
| 2014/0278007 | A1 * | 9/2014 | Wilcutts | F02D 41/0087 701/104 |

FOREIGN PATENT DOCUMENTS

| | | |
|---|---|---|
| CN | 102200066 A | 9/2011 |
| DE | 10 2004 052 703 A1 | 6/2005 |
| EP | 1777398 A2 | 4/2007 |
| GB | 2468872 A | 9/2010 |
| RU | 2010153310 A | 7/2012 |
| WO | WO8601562 A1 | 3/1986 |
| WO | WO9951868 A1 | 10/1999 |
| WO | WO2005124132 A1 | 12/2005 |

OTHER PUBLICATIONS

Office Action dated Nov. 10, 2017 for Chinese Application No. 201280060010.3, 7 pages.
Third Office Action, Chinese Application No. 201280060010.3, dated Apr. 3, 2017, 3 pages.
Office Action, Russian Patent Application No. 2014117700/06, dated Jul. 2, 2016, 4 pages.
Chinese Office Action for Chinese Application No. 201280060010.3 dated Dec. 2, 2015.
EP Communication and Supplementary European Search Report, Cited in EP Application No. 12838031.8, dated May 19, 2015, 5 Pgs.
International Search Report and Written Opinion for Application No. PCT/US2012/059121 dated Apr. 19, 2013, 9 pages.
Decision on Grant, Russian Patent Application No. 2014117700, dated Dec. 28, 2016, 7 pages.
Communication dated Nov. 23, 2018 for EP Application No. 12838031.8, 4 pages.
Office Action dated Jan. 9, 2019 for Chinese Application No. 201280060010.3, 8 pages.
Office Action dated Feb. 22, 2019 for Indian Application No. 741/MUMNP/2014, 7 pages.

* cited by examiner

Fig. 23

- PSG PROVIDES PRESSURE VS. CA SIGNAL
- ECU DOES FFT OF PRESSURE SIGNAL AND DETERMINES ORDER CONTENT
- SOFTWARE CODE DETERMINES CORRELATION OF PULSE TO ORDER (SENSITIVITY)
- CHANGES ARE MADE IN PULSE WIDTH TO CHANGE HARMONIC CONTENT
- VARIOUS MULIT-PULSE SCHEMES ARE POSSIBLE
- HARMFUL HARMONICS ARE MINIMIZED

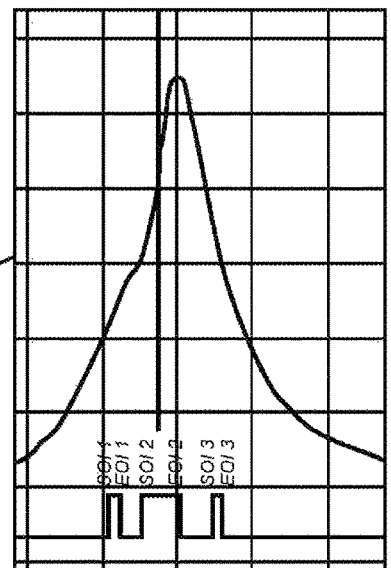

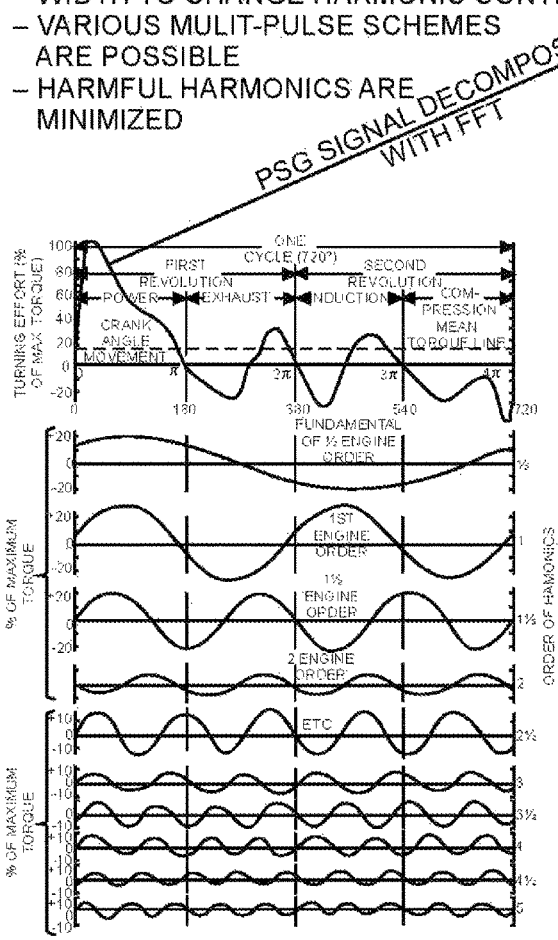

CORRELATION BETWEEN INJECTION PULSE, AND HARMONIC TORQUE COMPONENTS(S)

POTENTIAL INJECTION SCHEME(S) (MAY BE COMBINED)

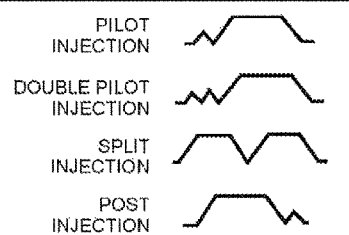

AERO COMPRESSION COMBUSTION DRIVE ASSEMBLY CONTROL SYSTEM

RELATED APPLICATION

This application is a continuation of application Ser. No. 13/646,576 filed Oct. 5, 2012, which claims the benefit of U.S. Provisional Application No. 61/543,624 filed Oct. 5, 2011, each of which is hereby fully incorporated herein by reference.

FIELD OF THE INVENTION

The present invention is a compression combustion drive assembly. More particularly, the present invention is a compression combustion drive assembly adapted for use in the aviation environment.

BACKGROUND OF THE INVENTION

At least since WWII, light aircraft (General Aviation and, more recently, drones) have been powered by an air cooled, gasoline fueled engine that was typically an opposed six cylinder arrangement. This engine was fueled by very high octane AvGas. The non availability of AvGas in the remote portions of the world has meant that general aviation was unavailable in such area, the very areas of the world that need general aviation services the most. More recently it has been seen that refineries have been reluctant to produce AvGas, thereby stretching the world's supply. While all fuels are not cheap, AvGas has been especially costly.

In contrast to the relative scarcity and costliness of AvGas, relatively inexpensive diesel fuel and/or jet fuel (JP) is much more generally available throughout the world. While the quality of such fuel can vary greatly, a compression combustion engine can burn either diesel fuel or jet fuel (JP) about equally as well. The variances can be recognized as variance in the cetane number of the fuel.

Such a compression combustion engine presents a number of challenges to its designer, including:
- variances in cetane rating of the fuel being used must be accounted for;
- variances in fuel, atmospheric, and injection abnormalities must be accounted for;
- all cylinders should be controlled to deliver substantially equal power;
- resonances in the entire drivetrain, comprising engine, transmission and propeller, need to be avoided;
- indication of degradation in engine components need to be provided to the pilot as a warning or a caution; and
- Indicated Mean Effective Pressure (IMEP) should be calculated as an indication of engine condition during engine run-ups prior to getting airborne.

There is a need worldwide for an aero engine that can operate on such fuel, yet avoids the challenges noted above.

SUMMARY OF THE INVENTION

The compression combustion engine of the present invention meets the aforementioned needs. Additionally, the compression combustion engine of the present invention meets these needs while at the same time providing the following features deemed necessary for such an engine to satisfactorily operate in the aero environment.

1. Combustion chamber pressure sensing (CCPS) can be integrated into aero Diesel engine management (the control system of the present invention) for the purpose of an ideally closed-loop injection system (but also open loop) that will be able to compensate for variances in cetane in the worldwide Diesel/Jet fuel stream.

2. By viewing the combustion event with combustion chamber pressure sensing, the injection timing and pulse width can be adjusted real time to compensate for variances in fuel, atmospheric, or injection abnormalities. The injection signal can be modified to compensate and time the peak cylinder pressure, breadth, and timing of the combustion event.

3. Combustion chamber pressure sensing can be used to balance the power output of an engine by ensuring that all cylinders are delivering likewise performance.

4. Combustion chamber pressure sensing can also be used to allow maximum engine performance from each cylinder without exceeding limits that may cause engine damage.

5. Combustion chamber pressure sensing can "combine" the individual contributions from cylinders in a way that the resultant overall torque signal does not resonate with known system natural frequencies (natural frequencies of the engine, transmission and propeller as a unit). This "off tuning" is relevant for harmonic disturbances that might otherwise cause resonance.

6. Combustion chamber pressure sensing can be used as a predictive maintenance tool to determine injector degradation and warn the pilot of an impending failure, compression testing, or weak cylinder performance. Since the current (prior art) systems approach is to provide an electrical signal which is correlated to provide a certain quantity of fuel, there is no provision for delivery discrepancies due to mechanical degradation of the injector and/or fuel supply.

7. Combustion chamber pressure sensing can be integrated with the injection system in closed or open loop fashion to minimize harmful engine dynamics that might excite propeller system resonance. They can be used to check the harmonic content of the pressure "signal" supplied by the cylinder.

8. Multi-pulse strategies can be used in combination with CCPS data to determine a pressure rise compatible with engine harmonics and structural strength. Combustion chamber pressure sensing can be used to alter the torque signature when approaching a potential natural frequency of an engine system.

9. Using CCPS data, the control system can be used to calculate Indicated Mean Effective Pressure (IMEP) of an aircraft or helicopter engine during "run-ups" prior to take-off at the field. IMEP data is the best indication of engine performance, and can be used as a "pilot aid" for flight planning. Combustion chamber pressure sensing can be integrated by the control system to ensure that sufficient energy is rejected to the turbocharger to sustain low power flight and sufficient boost pressure levels.

10. Combustion chamber pressure sensing can be integrated by the control system to determine when multi pulse strategies should be switched based on the combustion signature of the engine.

11. Combustion chamber pressure sensing can be used by the control system to determine bearing loads in a real time environment, and thereby avoid engine damage.

The present invention is a control system for an aero compression combustion drive assembly, the aero compression combustion drive assembly having an engine member, a transmission member and a propeller member, the control system including a sensor for sensing a pressure parameter in each of a plurality of compression chambers of the engine member, the sensor for providing the sensed pressure parameter to a control system device, the control system device having a plurality of control programs for effecting selected engine control and the control system device acting on the sensed pressure parameter to effect a control strategy in the engine member. The present is further a control method.

BRIEF DESCRIPTION OF THE DRAWINGS

FIG. 23 is a graphic depiction of a linking multi-pulse injection to cylinder pressure development in an engine control strategy;

DETAILED DESCRIPTION OF THE DRAWINGS

Figure 1:
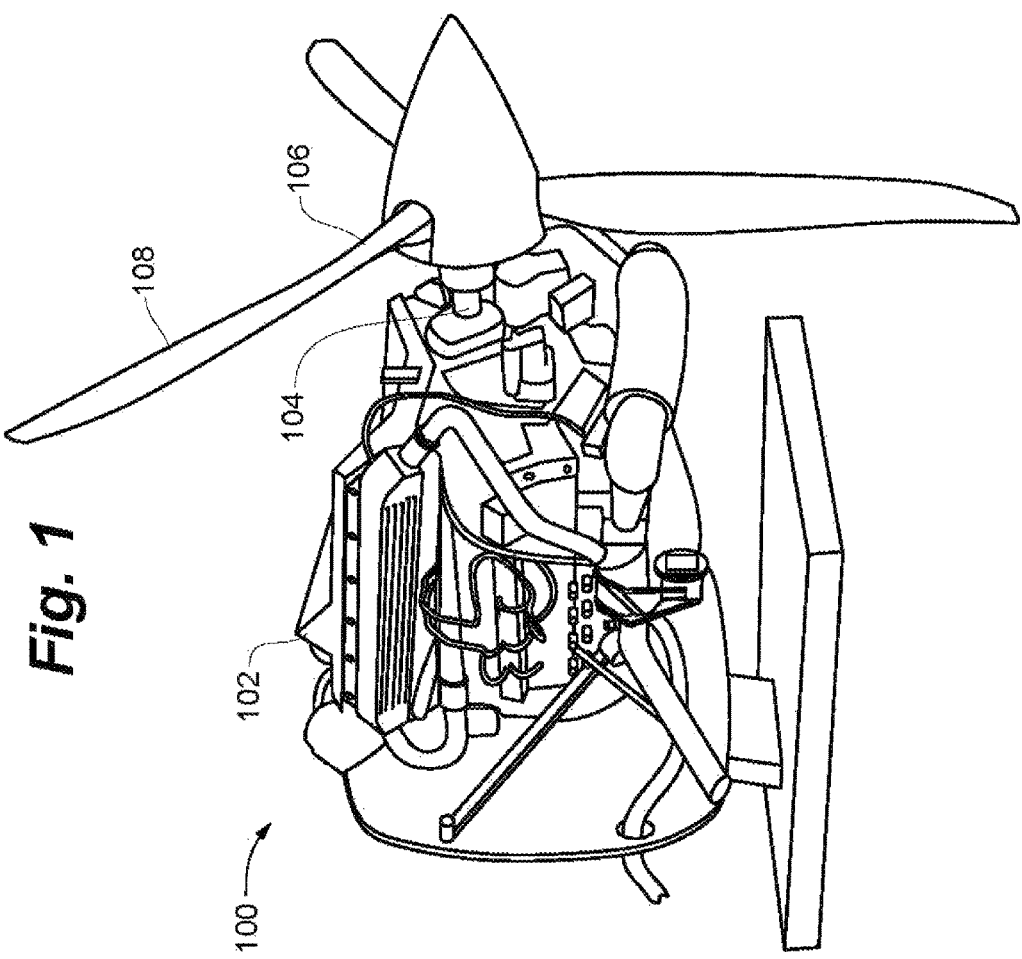
FIG. 1 is a perspective view of the aero compression combustion drive assembly of the present invention mounted on a test stand.

The compression combustion drive assembly of the present invention is shown generally at 100 in FIG. 1 and comprises engine member 102, transfer member 104 and propeller 106, the propeller 106 having three blades 108, in this particular example.

Figure 2:
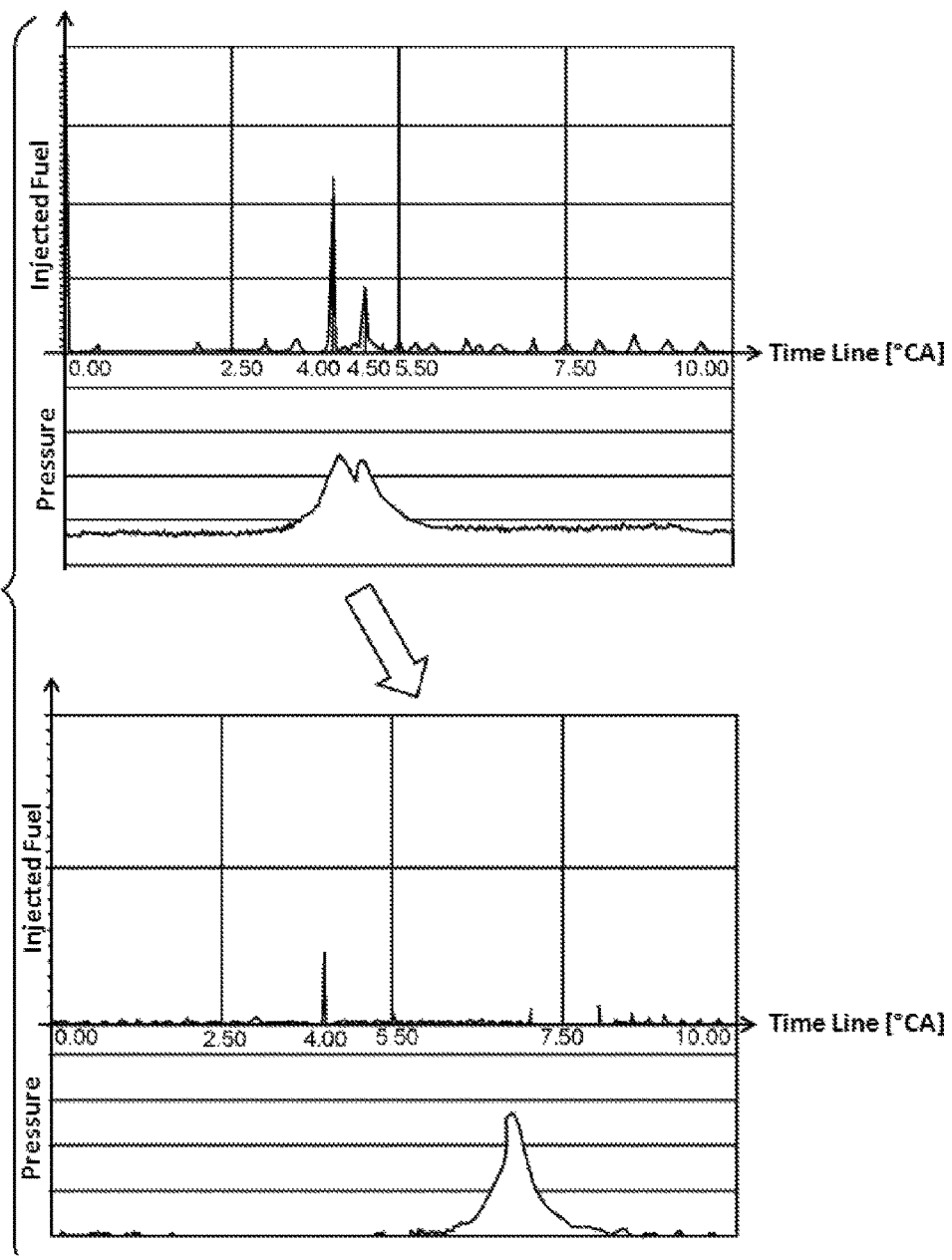
FIG. 2 is a graphic representation of how injection pulse strategy affects pressure development in a compression chamber.

The use of combustion chamber pressure sensing (CCPS) has allowed development of a control system (described in detail below) of the engine member 102 to solve many issues particular to the field of aero-Diesel engines by integration of open/closed-loop fuel injection control. See FIG. 2. Specifically, the control system has allowed the following to be addressed:

Fuel injection quantity and timing, bias of multi pulse strategies, and timing to address a widespread variation in available "Jet Fuel" stream worldwide.

Optimization of fuel quantity and timing to balance performance on a cylinder-by-cylinder basis to deliver the optimum fuel economy that the application demands.

The ability to monitor injector degradation over time as a performance, safety and predictive maintenance feature in aero Diesel engines.

A feedback mechanism to tune the cylinder pressure and hence the torque delivery quality of the engine. The torque harmonic content can be tuned to attenuate the particular vibration characteristics of the propeller and/or drivetrain resonance.

Determination of switching turbocharger control strategies for various altitudes and missions.

Indirect control of the amount of heat rejection to the turbocharger to maintain boost at low power settings necessary for extended descents, and go-around landings.

The determination of when to switch injection strategies for reliability and noise vibration and harshness (i.e. multi-pulse bias and/or count).

Using real time Indicated Mean Effective Pressure (IMEP), or average pressure over the cycle data to determine available power for take-off (airplane) or hover performance at any altitude or atmospheric condition.

Controlling maximum bearing loads via pressure measurements to prevent engine damage.

"Rate Shaping" the pressure rise to avoid resonance in the engine driveline and accessory systems.

The control strategies developed for the present invention integrate cylinder pressure sensing as a feedback mechanism in the engine management computer system (the control system). By evaluating the actual combustion results, and altering the injection events to meet the combustion targets, the control system of the present invention has achieved a superior and quantifiable combustion.

Figure 3:
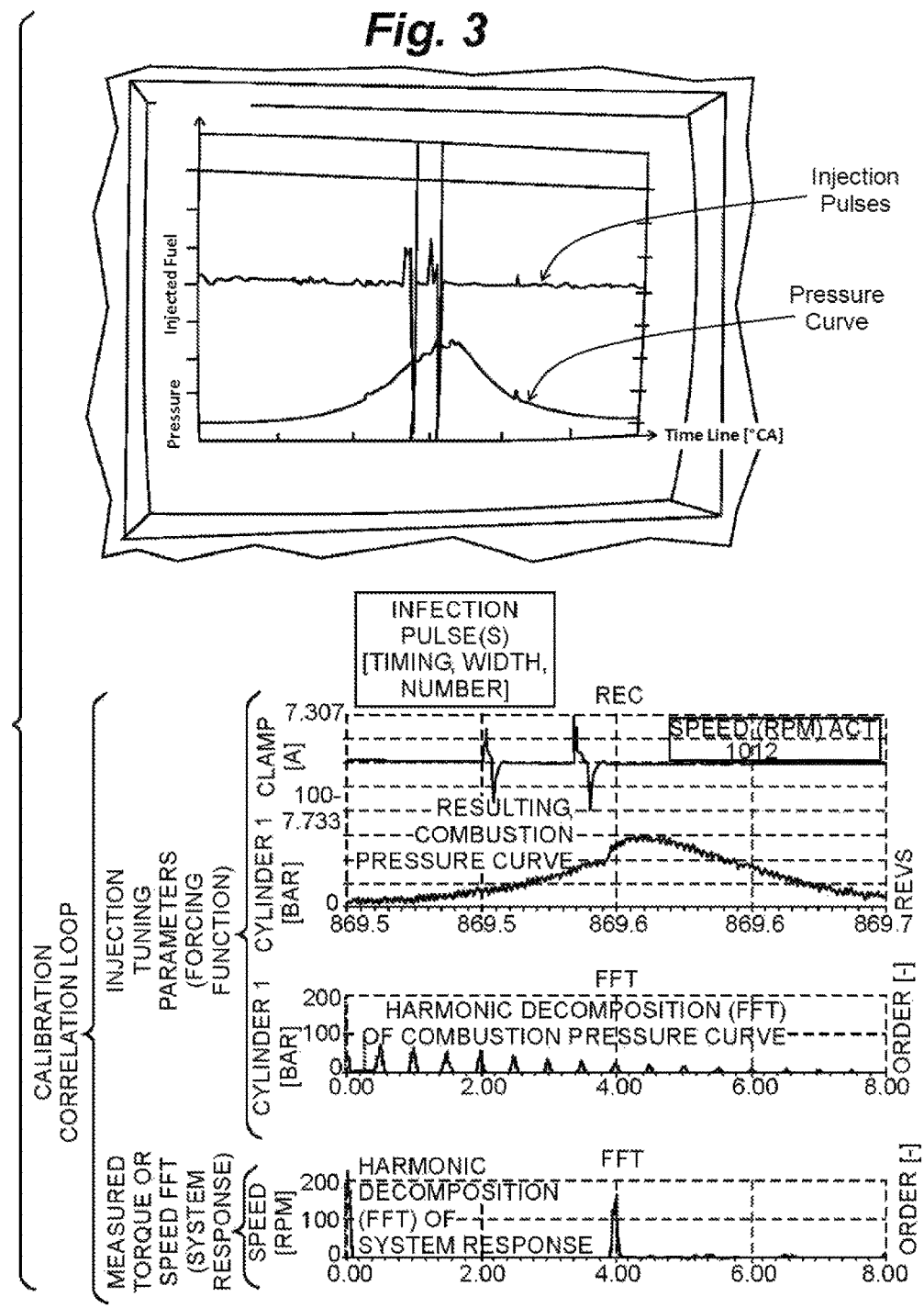
FIG. 3 is a graphic representation of pressure data derived from a combustion chamber pressure sensor coupled to the engine of the aero compression combustion drive assembly of the present invention.

The data shown in FIG. 3 depicts actual testing performed to calibrate an aero Diesel engine. The utilization of such data makes the engine substantially "impervious" to worldwide fuel discrepancies. FIG. 3 depicts an injection event with time along the X axis and injection volume along the Y axis. The top trace depicts two spaced apart injection pulses and the bottom trace depicts the pressure curve.

Balancing Engine Cylinder Performance

Any multi-cylinder engine is a collection of cylinders that share a common crankshaft. Although the cylinders may be dimensionally similar, the shared systems may cause discrepancies in engine performance on a cylinder-cylinder basis. Sources for these differences include, but are not limited to the following items:

Airflow differences due to a shared manifold, and/or valve timing

Exhaust differences due to shared manifold and/or valve timing

Location of the fuel injector relative to the manifold and/or timing

Thermodynamic differences due to local heat differences

Many other geometric factors

Any of these parameters may cause performance differences unique to a particular engine. Since the safety of many aircraft missions depends on reserve power to execute short take-offs on runways of limited distances or obstacles, performance optimization is essential.

The ability to measure individual cylinder pressure gives the control system of the present invention the ability to trim fuel requirements to balance the contribution of individual cylinders to the overall engine system. In such a scenario, the individual cylinder performance can be matched (or mismatched) to provide the required performance level required.

In such scenarios, the following is achieved with feedback mechanisms from the individual cylinder CCPS systems:

Maximum cylinder performance from each cylinder for maximum performance

Smooth engine torque delivery by balanced performance

Limited cylinder pressure to ensure bearing life with various firing order combinations Specific "off-tuning" to avoid harmful harmonics that may damage driveline components Minimum noise from coordinated combustion between the cylinders The previous items are just a sample of strategies that may be contemplated when CCPS input data is available.

Monitoring of Injector Performance Degradation Over Time

In diesel engines the injector is primarily responsible for the introduction of heat energy into the cylinder system. Modern fuel injectors are very advanced technology. They operate at pressures that approach 2000 bar. They are able to cycle on/off in extremely short time periods approaching 1-2 milliseconds. The injection fuel quantity may vary between 1-50 mm$^3$ per injection. The injector orifices can vary from 0.060 to 0.120 mm. With this level of precision, it is evident that a small amount of debris or erosion can degrade performance of the injector and affect the quantity and/or character of the fuel spray pattern.

Since the quantity of the fuel injected is determined by electrical pulse duration, the fuel delivery may not remain consistent over the life of the engine. Variation can be detected by the information provided by CCPS sensor technology integrated into the control system of the present invention.

Figure 4:
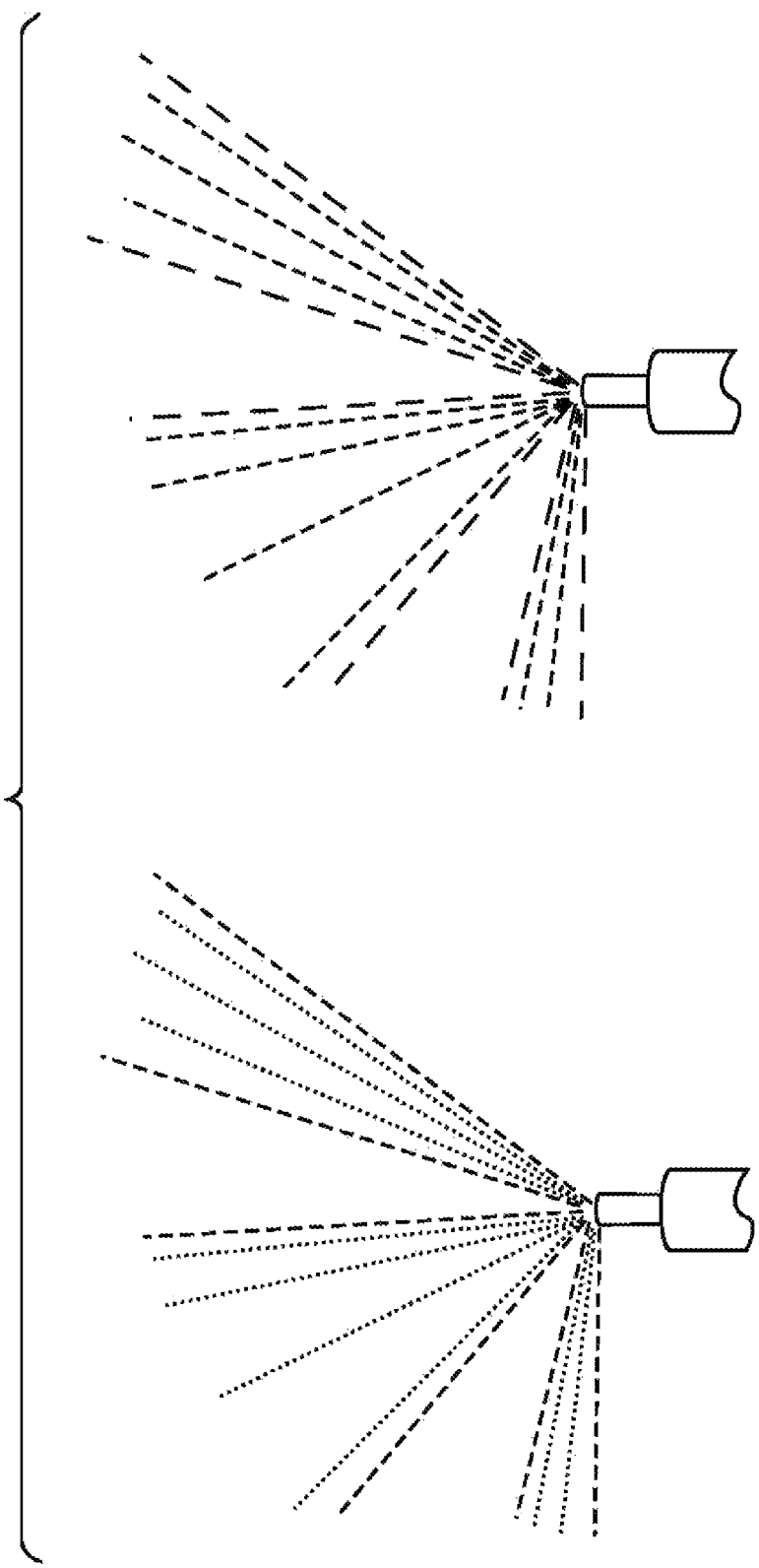
FIG. 4 is a schematic depiction of a degraded injector above and a normal operating injector below.

A deviation from the anticipated combustion pressure curve could indicate a plugged injector, and reduced performance for the engine. This would be vital information to a pilot of a light aircraft or helicopter, and could prevent loss of life and/or damage to the aircraft or surroundings. Note the degraded injector in the top image of FIG. 4 as compared to the normally operating injector in the bottom image. A system that detects injector performance degradation over time is a very useful preventative maintenance tool.

Using CCPS Technology to Affect Engine Torque Delivery for Enhancing Life of Propeller and Accessory Systems Aircraft engine drivelines are quite different from automotive drivelines in several ways. For example, an automotive driveline tends to become more massive as torque is multiplied until the point where the tire comes into contact with the road surface.

Figure 6:
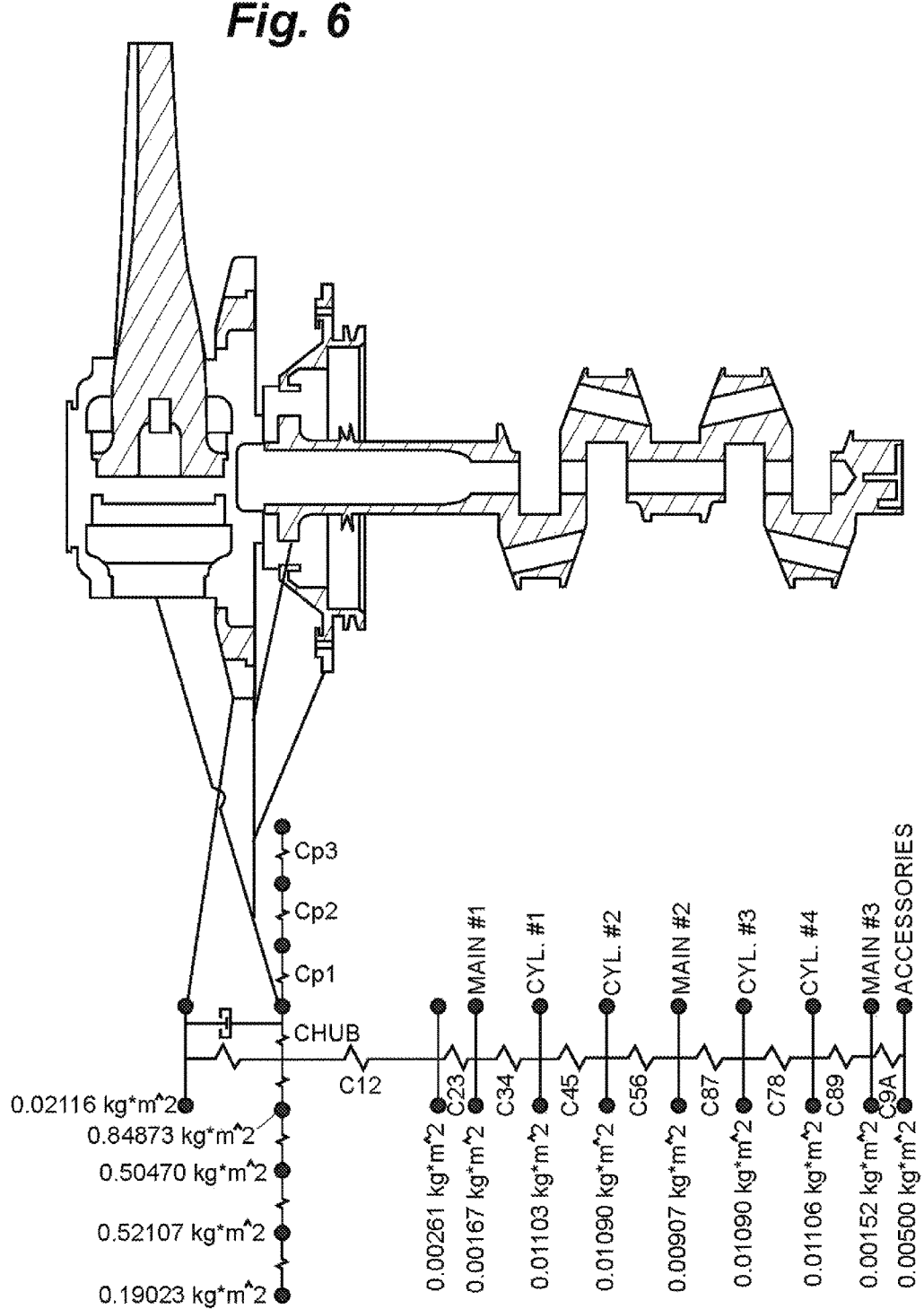
FIG. 6 is a spring mass representation of an exemplary aircraft driveline.

In contrast, aero drivelines are designed to be as light as practical. The size of shafting, gears, and structures is increased when torque is multiplied. However, the driveline is designed to be compliant so as not to deliver harmful torque spikes that may cause the lightweight propeller blades to resonate. Since diesel engines operate with peak cylinder pressures as much as 3-4 times that of their gasoline aero engine counterparts, torque harmonics are a significant concern in any aero diesel application. See the complex branch system depicted in FIG. 6 with propeller stiffness being considered.

Figure 5:
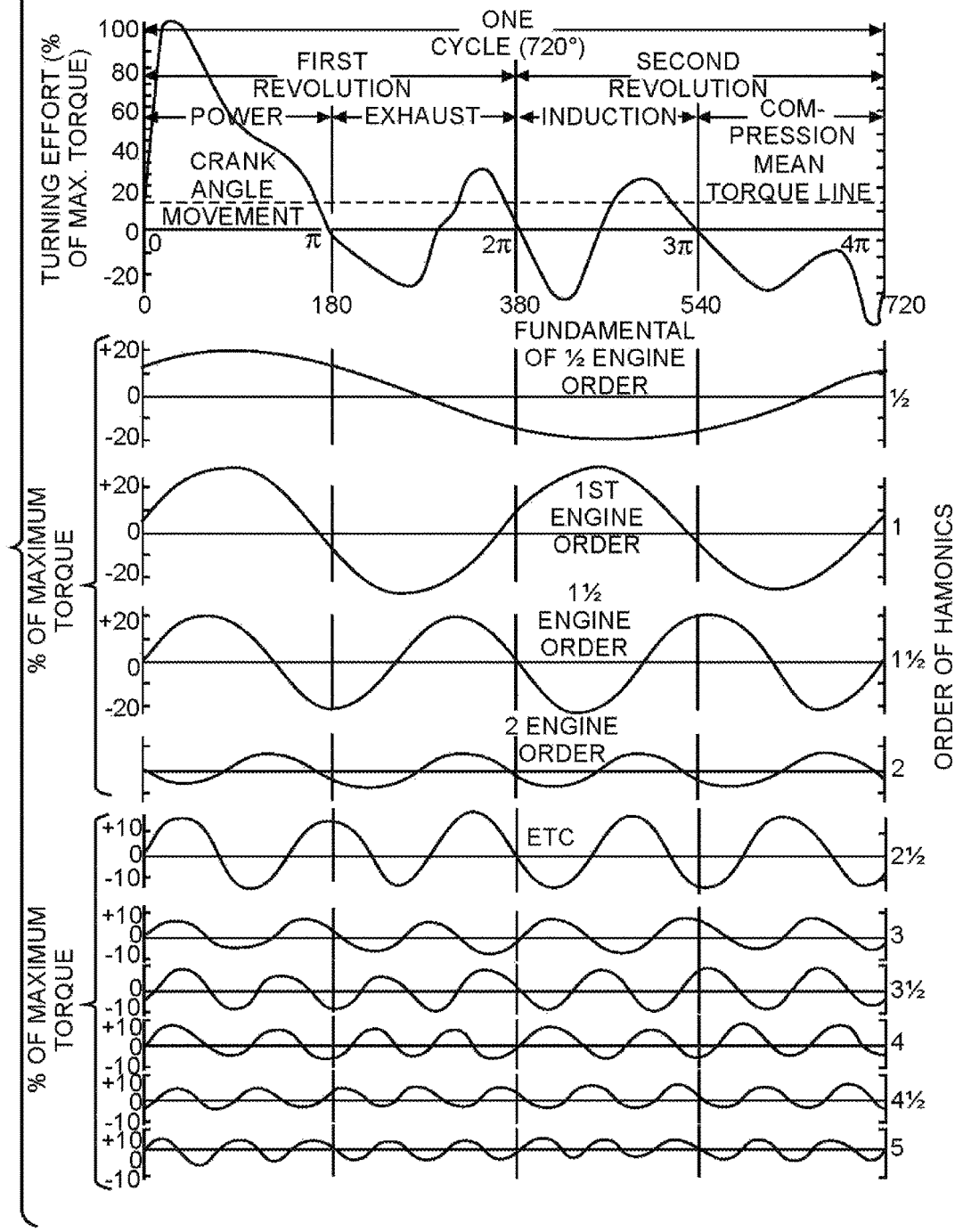
FIG. 5 is a graphic depiction of the harmonic decomposition of an individual cylinder by Fourier analysis.

FIG. 5 is a depiction of a Fourier de-composition of a sample engine pressure rise. The cyclic curves below, when scaled and added will approximate the top curve exactly. The steeper the pressure rise is, the more high order content will be required to resemble the gas curve.

Highly stressed structures such as propeller blades, tend to have a high strength-to-weight ratio which results in a high natural frequency (with little damping to arrest their movement). An aluminum propeller will resonate if the torque impulse is equal to its own bending natural frequency. Its failure is imminent if the periodic disturbance is continued.

High performance Diesel engines exhibit extreme pressure rises as cylinder pressure increases from manifold pressure to near 200 bar during the combustion cycle. Fortunately, extensive development efforts have resulted in fast acting injectors. Multiple injection pulses can be used to "round off" the pressure rise, and reduce its shock to the downstream components. This results in a dramatic reduction in structure borne "combustion noise" but more importantly reduces the stress on pistons, con-rods, bearings, crankshafts, valve train and other aircraft specific components such as reduction gears, propeller governors, and propellers while increasing the useful work.

By examining the pressure signal of a running engine, the control system of the present invention includes tuning strategies to avoid harmful harmonic content that may cause significant propeller blade stress, gearbox fatigue, and accessory damage.

Figure 7:
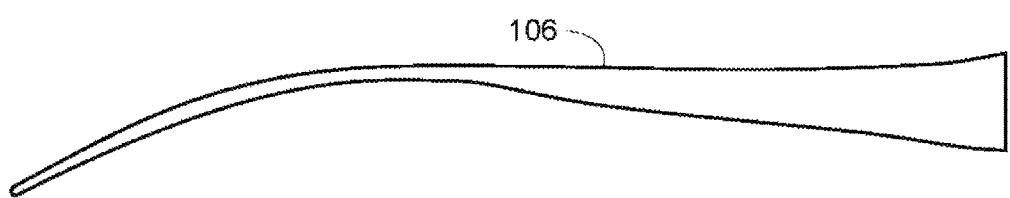
FIG. 7 is a depiction of a first order bending mode of an aluminum propeller blade.

Depending on the pitch angle, torsional resonance can cause a propeller blade to resonate in a bending mode. See FIG. 7. The stress can be multiplied many times without sufficient blade damping, in a phenomenon called resonance. In crystalline structures (as are prevalent in metallic propellers) there is very little damping. The reader may note that as resonance is approached, stress can be multiplied (as in the center of the blade in FIG. 7) and may exceed the empirical fatigue limits of the material. From our experience, this will drastically reduce the life of the propeller blade and hub. In fact, major aluminum propeller suppliers will not "pass" a propeller in validation testing if their stress limits are exceeded.

Electronic control of the fuel system is able, in part, to soften the "impulse torque" input to the propeller system, as is described below.

A typical aircraft engine in the last 70 years have been "placarded" to avoid operation at various speeds for extended time periods. This was done to simply allow the aircraft pilot to avoid resonance by "passing through" dangerous areas quickly. A placard available in the cockpit indicated to the pilot which engine regimes to avoid.

The present control system processes combustion data and does an analysis to determine harmonic content of the gas curve. If a critical speed for the propeller system is approached, the control system acting on the injection system "deadens" the combustion by exercising appropriate control of the engine injectors to minimize the harmonic content of the torque impulse, and prevent propeller and/or systems damage resulting from resonance.

Determining Turbocharging Control Strategies for Various Altitudes and Missions

Turbocharger control has become a large part of engine tuning where high performance is required. Turbocharger maps look a lot like topographic maps with "efficiency islands" indicated.

The highest practical limit for a single stage turbocharger is in the vicinity of 4 bar pressure ratio. Fortunately, turbochargers naturally compensate for a rarified atmosphere by speeding up with an increase in elevation. This feature sounds practical until the "speed limit" is reached at high elevations. The upper limit is a speed that beyond which the turbocharger wheel may burst due to high centrifugal loads.

In order to operate an aero Diesel at high elevation (25,000 ft. MSL) a dual stage turbocharger is likely required. Typical automotive Diesel engines already have explored staged turbo charging as a means of reducing engine size and fuel consumption for cruising at highway speeds. In an aircraft application a similar scheme is adopted to reduce engine size for weight reasons. In this case, it is necessary to monitor the switching of the secondary turbocharger to keep each system operating near its optimum efficiency island.

The use of sequential turbo charging is necessary to operate at high altitudes.

One feedback input to the control system is the actual turbine speed. But utilizing the CCPS data, the control system enables looking at the character of the combustion curve to determine when to "activate" the secondary turbocharger. Since "injection delay" is an indication of the air motion in the combustion chamber, a slow delay would indicate lack of mixture motion. This threshold is then used to trigger the secondary turbocharger bias.

Use of Real Time Indicated Pressure to Calculate Available Power for Mission Critical Flights One aspect of a pilot's responsibility is to calculate the weight and balance of his aircraft for flight planning purposes. With the use of CCPS instrumentation, the actual performance of the engine can be calculated by the control system before takeoff, during a normal engine "run-up".

The pressure trace from the individual cylinders can be used to calculate the power available based on indicated mean effective pressure. The indicated mean effective pressure is an average pressure over 720 degrees in a 4-cycle engine. IMEP is the best indication of the available power from an engine. It does not take friction into account, but is a very good estimation for the power available on the takeoff run or hover calculation for light helicopters. An alternative approach would approximate power accurately using and indirect approach. An alternative scheme would use peak cylinder pressure, pressure rise, and timing of the peak cylinder pressure to determine the available power indirectly.

The control system integrates CCPS data into its management system as a pilot aide to determine available power at takeoff.

Piston helicopters also benefit from such data. One of the critical aspects to the helicopter pilot is the ability of the helicopter to hover out-of-ground-effect. The hover capability of a helicopter is primarily determined by gross weight, engine power, and elevation (density of air). It can be dangerous to lift off in ground effect, and then transition to flight without ground effect (off a cliff or building). If there is insufficient power to sustain lift, the helicopter will descend, and may crash to the ground before the pilot can take control of the situation. A CCPS would be the most accurate way to determine engine performance before leaving the ground, and thus a huge safety feature.

One of the problems that have been associated with Diesel engines is sustaining a healthy combustion during long descents at low power settings. Some notable Unmanned Aerial Vehicles (UAVs) have encountered "frozen combustion" during long low power descents. UAV's are particularly prone to these phenomena due to their design as a "loitering vehicle". They are essentially gliders with engines to assist in the mission. The engines are used to sustain flight and generate electricity for the electronic surveillance and flight controls.

Figure 8:
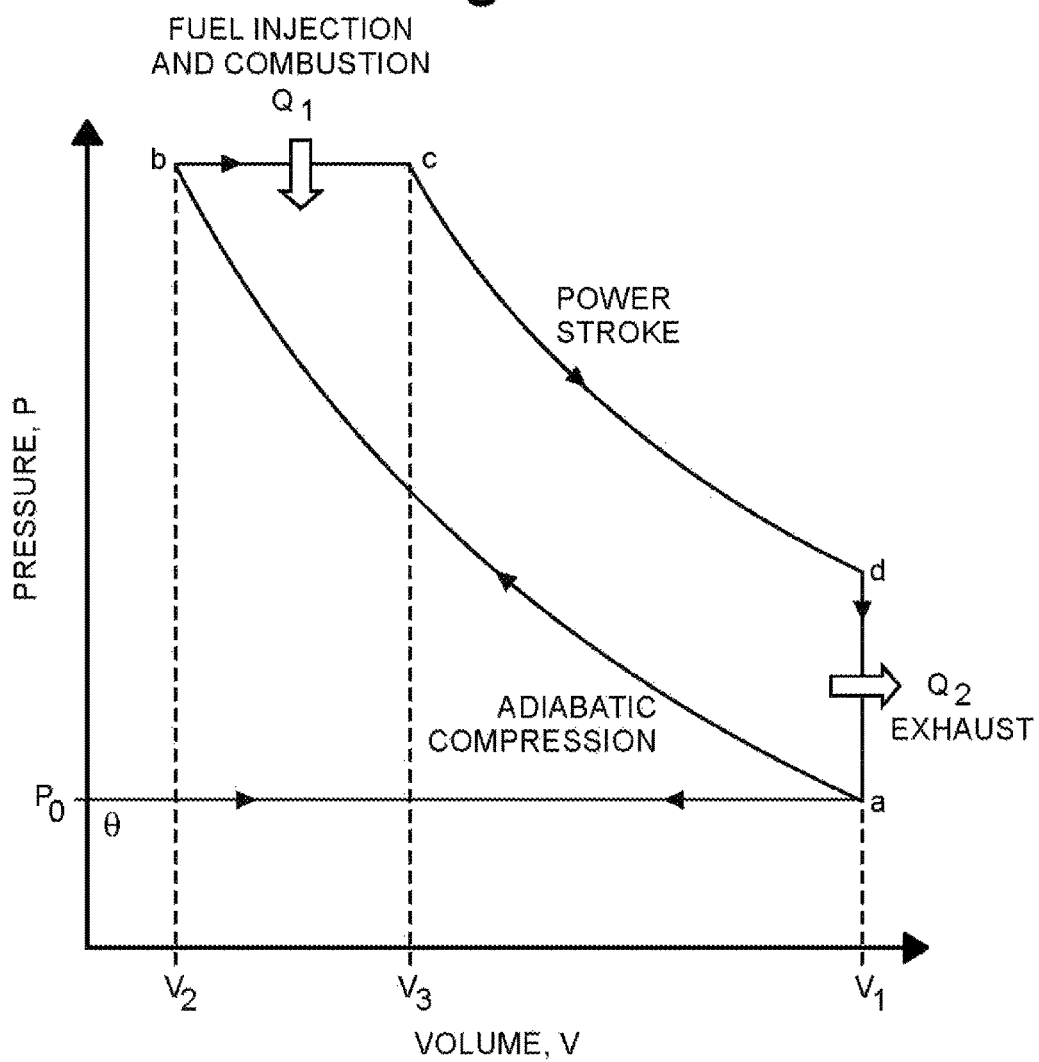
FIG. 8 is a simplified Diesel cycle diagram.

The simplified Diesel cycle diagram in FIG. 8 depicts the heat leaving in the exhaust as indicated in the term $Q_2$. The quantity of heat in the exhaust is determined by the residual amount of fuel from the last injection pulse, and the timing of the exhaust valve opening as indicated by "d" in the diagram.

In conditions where the actual power produced from point "c" to "d" is minimal, the CCPS data is a very useful tool to determine if the combustion is "healthy" or in danger of "flaming out". Utilizing the CCPS data, the control system may choose to add additional fuel near the end of the expansion, not to produce power, but to sustain sufficient manifold pressure for the engine to have on reserve. Since the engine is not producing crank power in this mode. The intent of a "post Injection pulse," is to keep the turbocharger speed up regardless of the engine output required. Having immediate boost is desirable for "missed approaches" when a pilot needs to add power immediately for a "go around".

The control system utilizing CCPS technology is used to maintain "healthy combustion" during low power descents. With a combination of turbo speed, cylinder pressure, and ambient pressure, the software can maintain these healthy conditions. The ambient pressure sensor can trigger the software if the aircraft is in a descent mode, based on the pressure altitude. Low power settings can be determined with IMEP values in conjunction with the turbocharger speed. In the case when both conditions are low.

Figure 9:
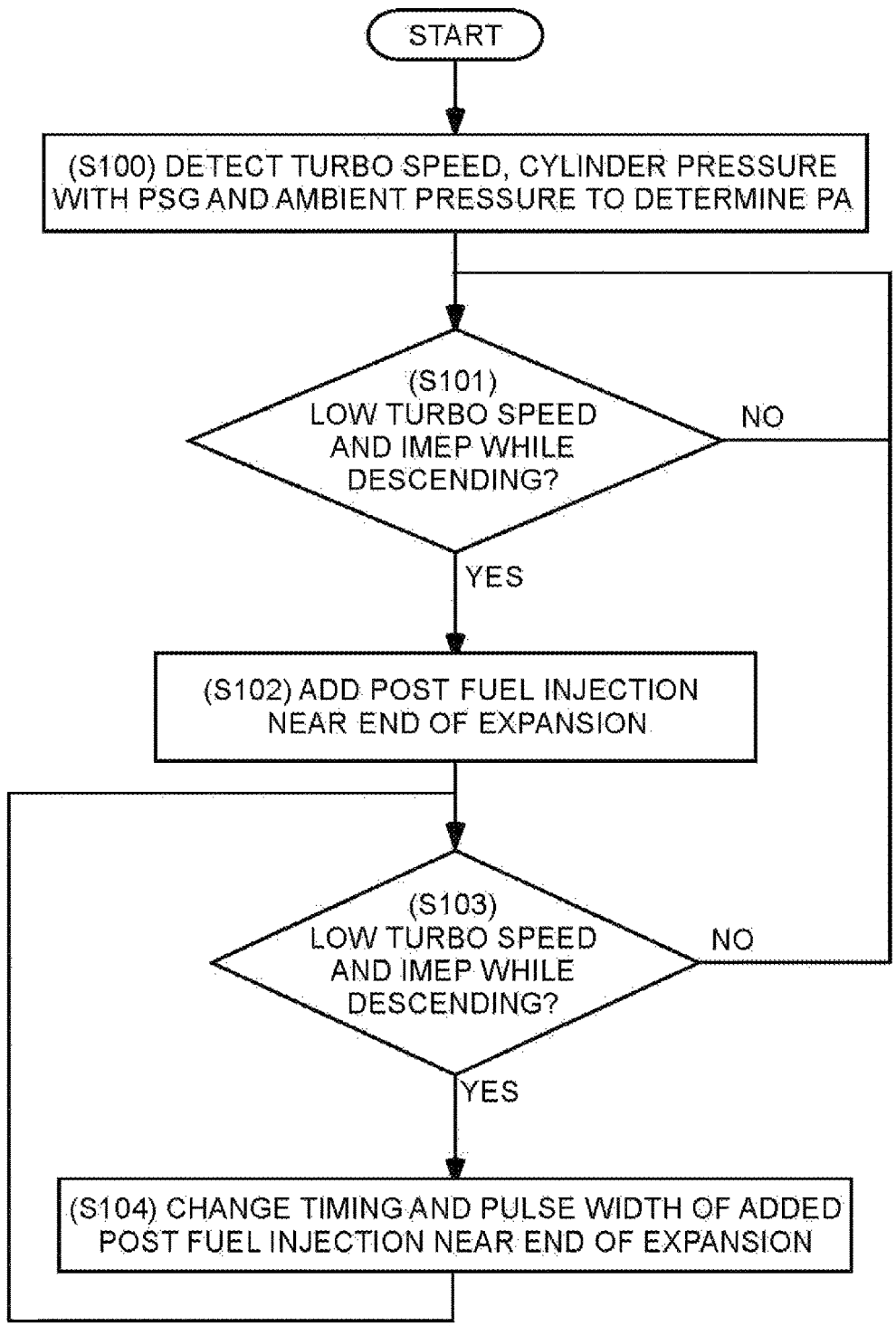
FIG. 9 is flow diagram for engine control in a descent.

To maintain a healthy manifold pressure and keep the turbocharger spooled up, added energy in the form of fuel is necessary. An added fuel injection towards the end of the combustion cycle will create the required energy to spool up the turbocharger and create a higher manifold pressure. See FIG. 9. This will be checked by the software and corrected if needed by changing the timing and trimming of the pulse width. The software runs this in a closed loop until the healthy combustion is achieved or flight plan changes (e.g. high power setting is demanded). FIG. 9 shows the flowchart of the control software to effect the above.

Using Combustion Chamber Pressure Sensing to Determine When to Switch Injection Pulse Strategies The control system of the present invention alters the pulse strategy and dwell of each event in an effort to maximize the delivered torque, and alter its character based on readings from integrated CCPS elements in the cylinder head.

For example, the control system may choose to add an "after injection" pulse of fuel. This pulse is used to sustain turbo speed in high altitude operations. Any combination of pre-injection pulses and main injection pulses may be used to rate shape the cylinder pressure rise to soften or avoid troublesome harmonics, and increase useful work and efficiency.

Using Combustion Chamber Pressure Sensing to Limit Bearing Loads and Prevent Engine Damage In any engine, the loading of its bearings is directly related to the cylinder pressure and the area of the piston. The product of the pressure (P) multiplied by the area (A) of the piston gives the instantaneous gas force of the piston. Actual bearing loading depends on the inertial properties of each component as well.

The control system can draw conclusions about bearing loading based on CCPS cylinder pressure data as acted on by the control system as a means to limit the gas force applied in certain modes of engine operation.

One example is to a main bearing that is loaded "twice" by adjacent cylinders in a multi-cylinder configuration. In this example, the oil film may be diminished considerably when adjacent firings are from the same bank of cylinders.

Cylinder pressure varies with engine output. Since the gas force is proportional to the injected fuel, and combustion characteristics, it is useful to know what its magnitude might be. The control system, using integrated CCPS data, can give insight to the combustion magnitude, and the subsequent bearing loads. Since the component inertial loading and the speed is known, an exact bearing load can be determined with gas force data. This can prevent premature bearing failure by warning the operator of bearing overload.

Figure 10:
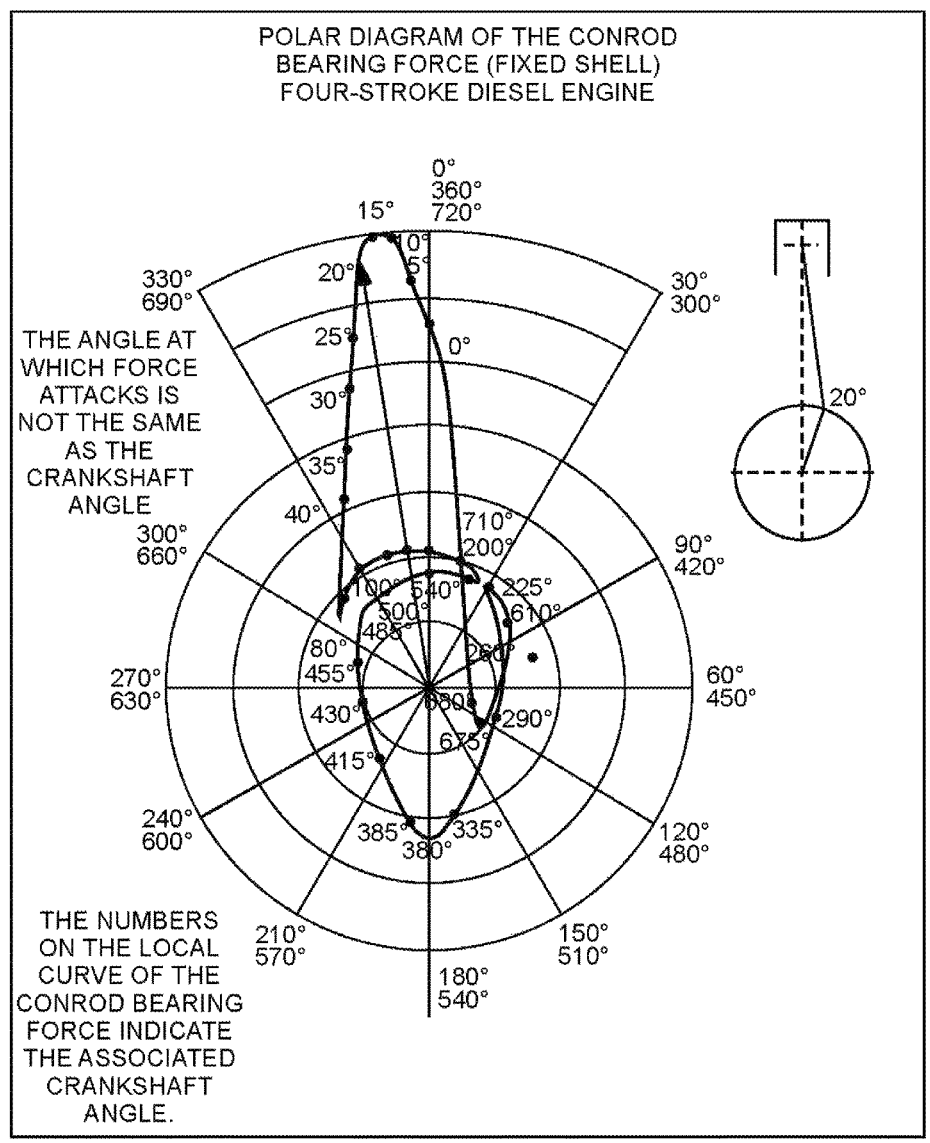
FIG. 10 is a diagram of an exemplary combined inertial and gas loading for a conrod bearing.

FIG. 10 is a depiction of how a lower connecting rod bearing is loaded with inertial forces (egg shape) and combined with a gas force (top portion) component. The inertial forces are easily calculated with component mass, speed, and geometry, while the gas forces depend on the product of actual combustion pressure and piston area. Combustion chamber pressure sensing allows insight into the loading of the internal engine components.

Figure 11:
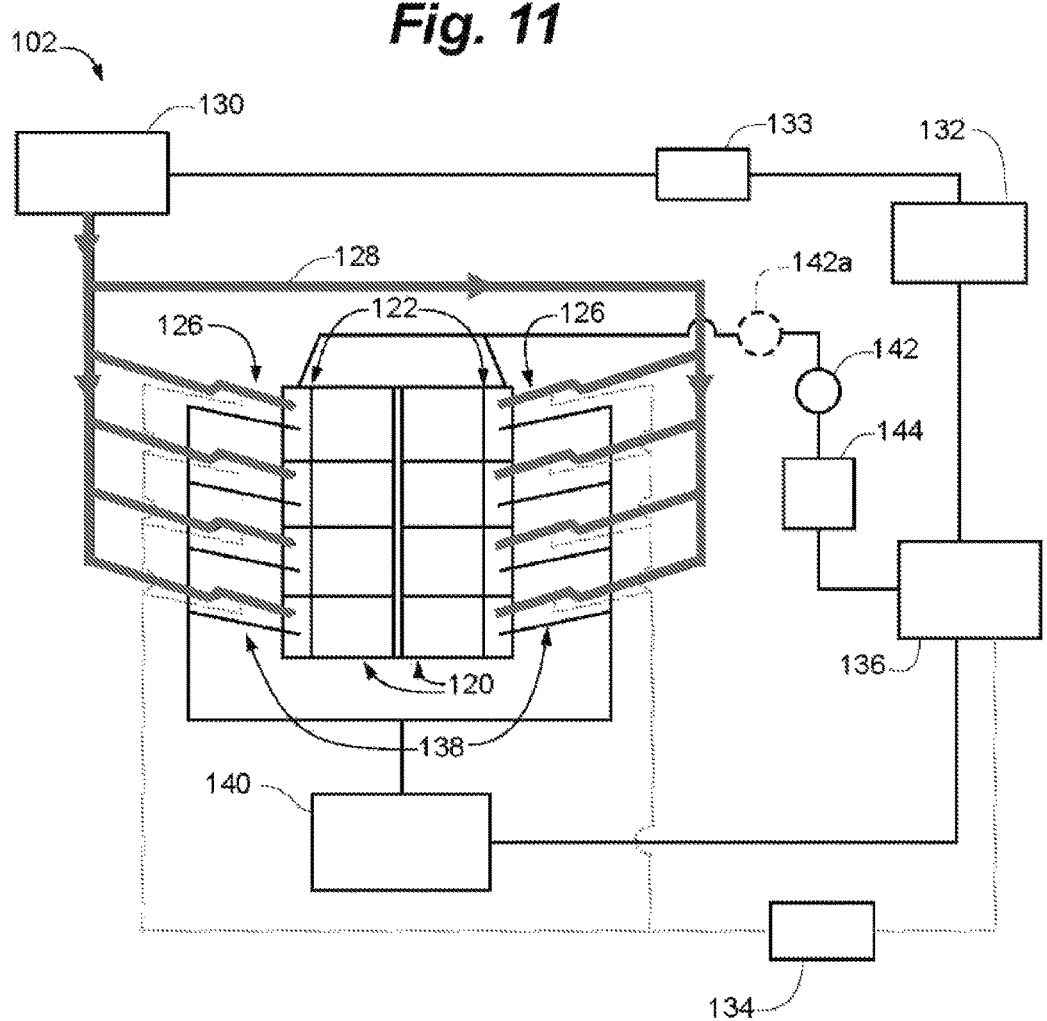
FIG. 11 is a schematic view of the engine and control system of the present invention.

A diesel engine member 102, as depicted in FIG. 11, includes a plurality of cylinders 120. In a preferred embodiment, the engine 102 is a flat configuration, having four cylinders in a first bank and an opposed bank of four additional cylinders. The engine 102 of FIG. 1 is of such configuration. Each of the respective cylinders 102 has a combustion chamber 122. A fuel injector 126 is disposed in each of the respective combustion chambers 122. Fuel is supplied to each of the respective fuel injectors 126 by a common rail 128.

The common rail 128 is fluidly coupled to a high pressure pump 130. The high pressure pump 130 is fluidly coupled to a fuel tank 132. A fuel filter 133 may be interposed between the fuel tank 132 and the high pressure pump 130.

An electronic injector control 134 is coupled to each of the respective fuel injectors 126, each of the respective fuel injectors 126 being susceptible to electronic control for timing and pulse width control. The injector control 134 is operably coupled to a control system 136.

A CCPS sensor 138 is operably coupled to each of the respective combustion chambers 122. Each respective CCPS sensor 138 is in turn operably, electronically coupled to the control system 136. Data sensed by each respective CCPS sensor 138 is thereby provided to the control system 136. It is understood that the control system effects control of the injectors individually responsive to the data received from the CCPS sensor 138 that is mated to the combustion chamber 122 that is served by the respective fuel injector 126.

The engine member 102 additionally has at least one turbo 142 for delivering a charged air supply to the respective combustion chambers 122. A turbo control 144 is operably coupled to the turbo 142 and to the control system 136. By this means, the control system, using data received from the CCPS sensors 138. Communicates commands to the turbo control 144 for control of the turbo 142 as desired.

The engine 102 of the present invention preferably utilizes a Pressure Sensing Glowplug as CCPS 138 in each cylinder for the purposes of monitoring cylinder pressure in the engine. The CCPS sensor 138 is used as an analog input to the control system 136.

The use of CCPS technology as a feedback in real-world installations can optimize engine calibrations for a variety of conditions.

The focus of CCPS integration into the control system in this application is to identify the strategies of utilizing this technology for the benefit of aviation Diesel applications. The work in this application therefore focuses on the "WHEN" and "HOW" pressure is developed in a Diesel aircraft engine. The information obtained from CCPS input is used to optimize efficiency, provide for reliability, improve pilot information, and diagnose injection systems for predictive maintenance. These aspects all have the focus of improving GA and Unmanned Aerial Vehicle (UAV) safety by using electronics to the pilot's benefit.

How Fuel Quality Affects Pressure Development in Diesel Engines

Cetane is a quality in kerosene derivative fuels that defines how rapidly combustion occurs in a Diesel engine. A high cetane number means that the fuel will begin to ignite rapidly and continue burning in a controlled fashion. Low cetane fuel will ignite more slowly, and then cause a rapid pressure rise as the piston approaches Top Dead Center (TDC) in an engine.

Figure 15:
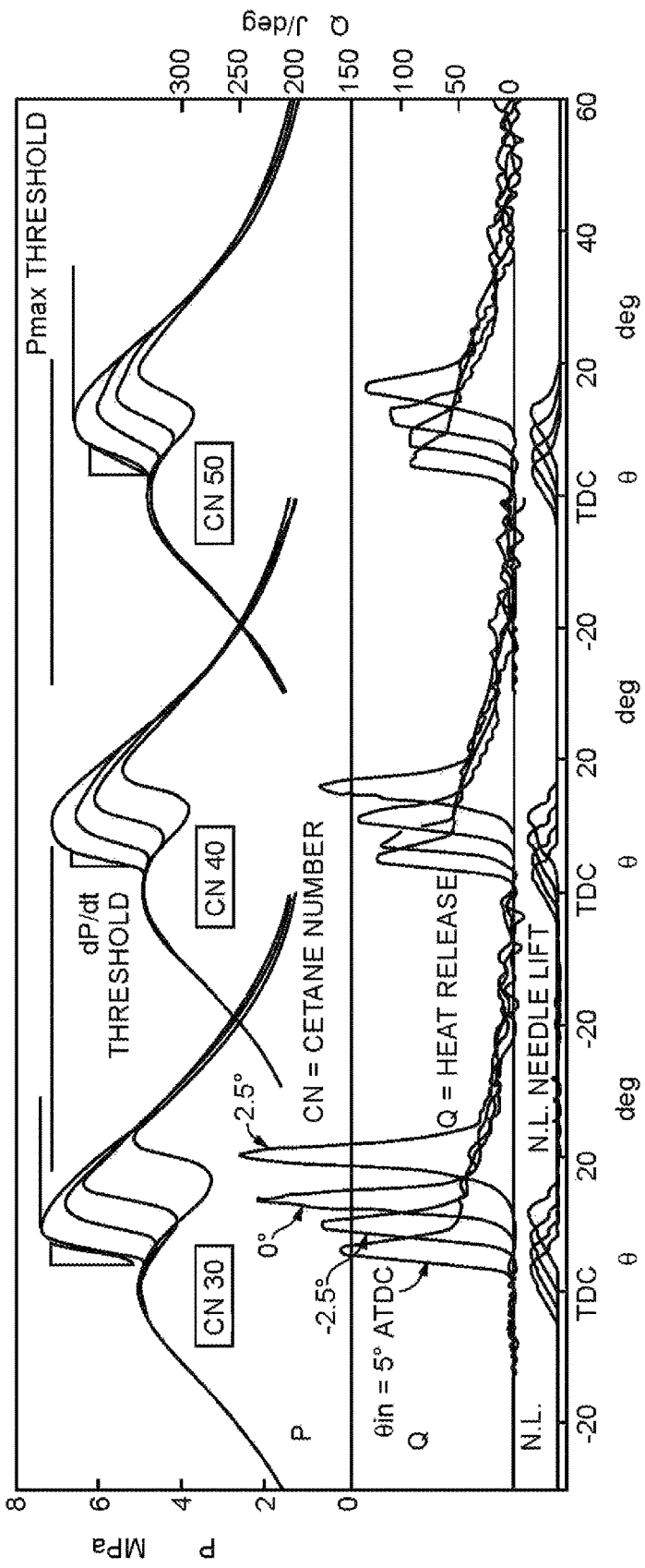
FIG. 15 is a depiction of the use of CCPS to check threshold limits of maximum pressure and rate change in pressure due to cetane to determine abnormal combustion.

The CCPS sensor is particularly useful in identifying some of the characteristics of combustion with low cetane fuel. There are three characteristics that are noticeable immediately. The reader may note by examination of FIG. 15 that low cetane fuel has a longer ignition lag, but once ignition starts, the energy in the fuel rapidly combusts.

The CCPS sensor in combination with a crank speed sensor can determine if the combustion process is within set limits for "normal" combustion. An increase in the slope of the pressure curve (dP/dt) may indicate one or more of the following:

The aircraft was fueled with a low quality Jet fuel

Figure 12:
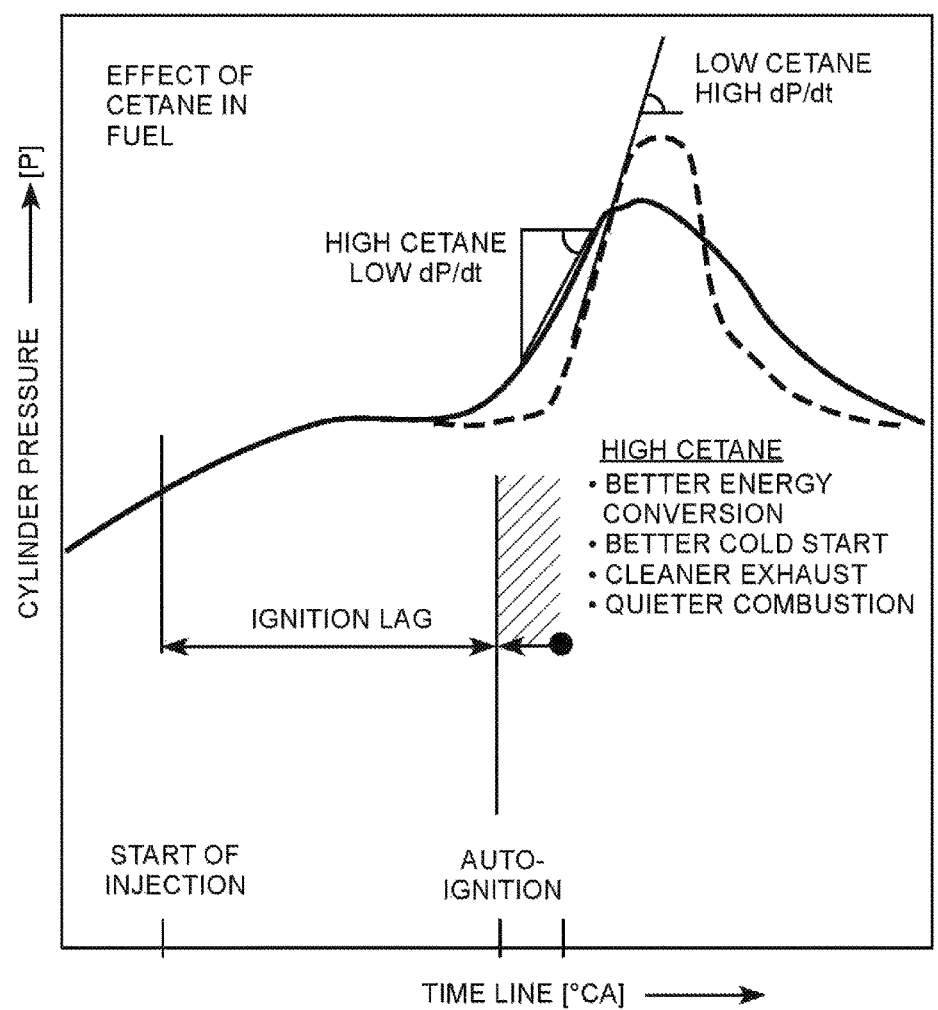
FIG. 12 is a graphic representation of how cetane number (CN) affect pressure rise.

Large quantities of bio-fuel (largely uncontrolled) are present in the fuel supply Perhaps gasoline was mistakenly pumped into the aircraft fuel tanks Other elements of the fuel injection system are in need of maintenance There are other significant characteristics that may be determined with CCPS sensors 138. Examination of FIG. 12 shows that typically the increased ignition delay or lag results in a change of the peak cylinder pressure timing point, which may be referenced to TDC or some other fixed point.

Since the injected fuel quantity is closely calibrated with the mechanical injection system, and the heating content of varying Jet fuels are not different, when the fuel does combust, it tends to reach a higher peak cylinder pressure. Thus low cetane fuel combustion (See FIG. 12) can be "sensed" in one of three ways:

1. Higher than "normal" pressure rise per crank angle (dP/dt)
2. Longer than "normal" time for peak cylinder pressure to occur (long ignition delay or lag)
3. Higher than "normal" peak cylinder pressure The boundaries of what is "normal" is selected and implemented in the control system 136. The CCPS 138 can be used in conjunction with a crank sensor to measure pressure against a time function for combustion evaluation. In particular, the period of combustion pressure development can be integrated by the control system 136, with the intent of evaluating the point where the combustion is effectively "centered" in its development time period. This can be done to effectively perform an integration of the pressure function during its development. This pressure development shape is depicted for each type of combustion in FIG. 13.

Figure 13:
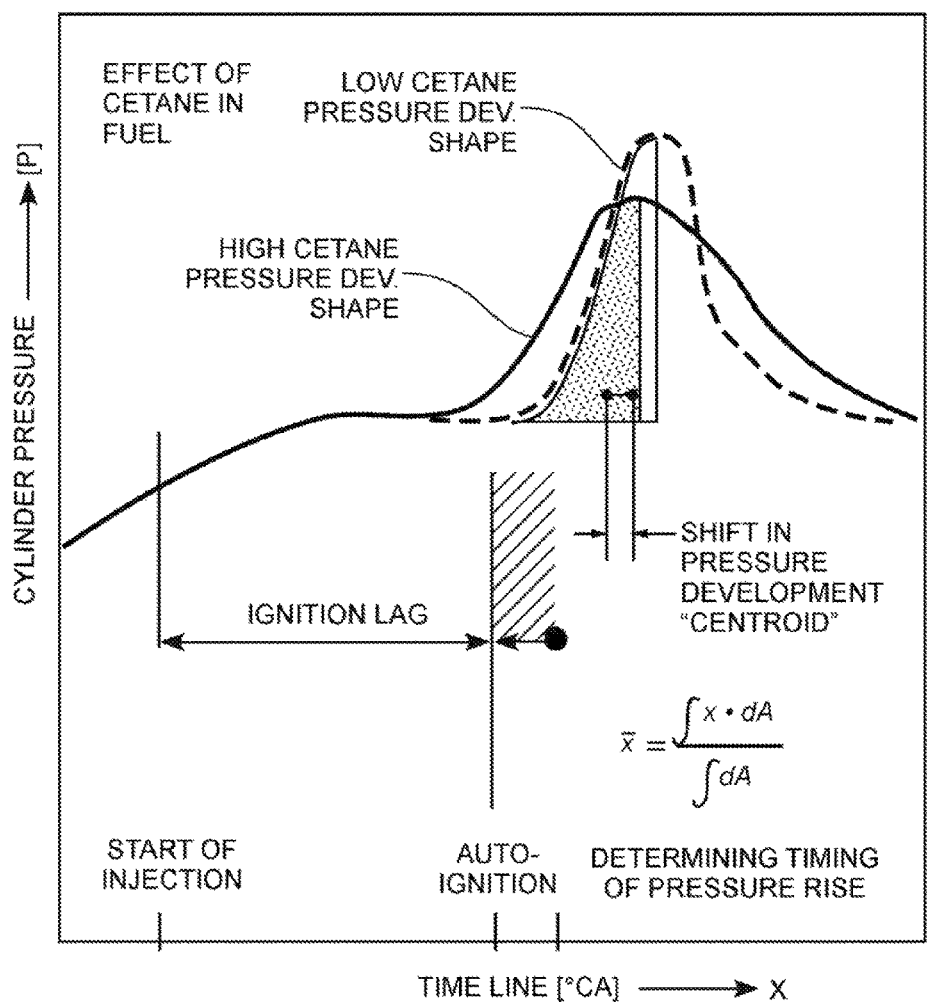
FIG. 13 is a graphic representation of the use of the pressure signal to determine its centroid shift in the time domain.

Using an integrated shape as noted in the lower right corner of FIG. 13 is a useful way to determine an actual phase shift in injection timing that can place the peak cylinder pressure back in its usual location. This method of estimating angular timing shift is more accurate than trying to locate the angular point of highest pressure in each case.

Another method is to accurately determine the "peak pressure" in the vicinity of the anticipated peak cylinder pressure by looking for the point when dP/dt is effectively "zero" and using that point and the mean slope for a period preceding the peak cylinder pressure in time. In this fashion we can also obtain using timing information for peak cylinder pressure location, and the development character of the cylinder pressure, or dP/dt.

Adapation of Injection Strategy to Compensate for Low Quality (Low Cetane) Fuel

The control system 136 injection strategy relies on the CCPS 138 to detect particular threshold conditions associated with abnormal combustion due to poor quality fuel. The particular threshold limits are:

An abnormally high/low change in pressure per crank angle (dP/dt) for a given engine speed and load (propeller governor setting) map An abnormally high/low peak cylinder pressure ($P_{max}$) for a given engine speed and load (propeller governor setting) map When either (typically both) conditions above are sensed to be out of limit by the CCPS element, our strategy indicates that we are running with a lower/higher quality fuel than anticipated. A control strategy is implemented at this instant in time.

Figure 14:
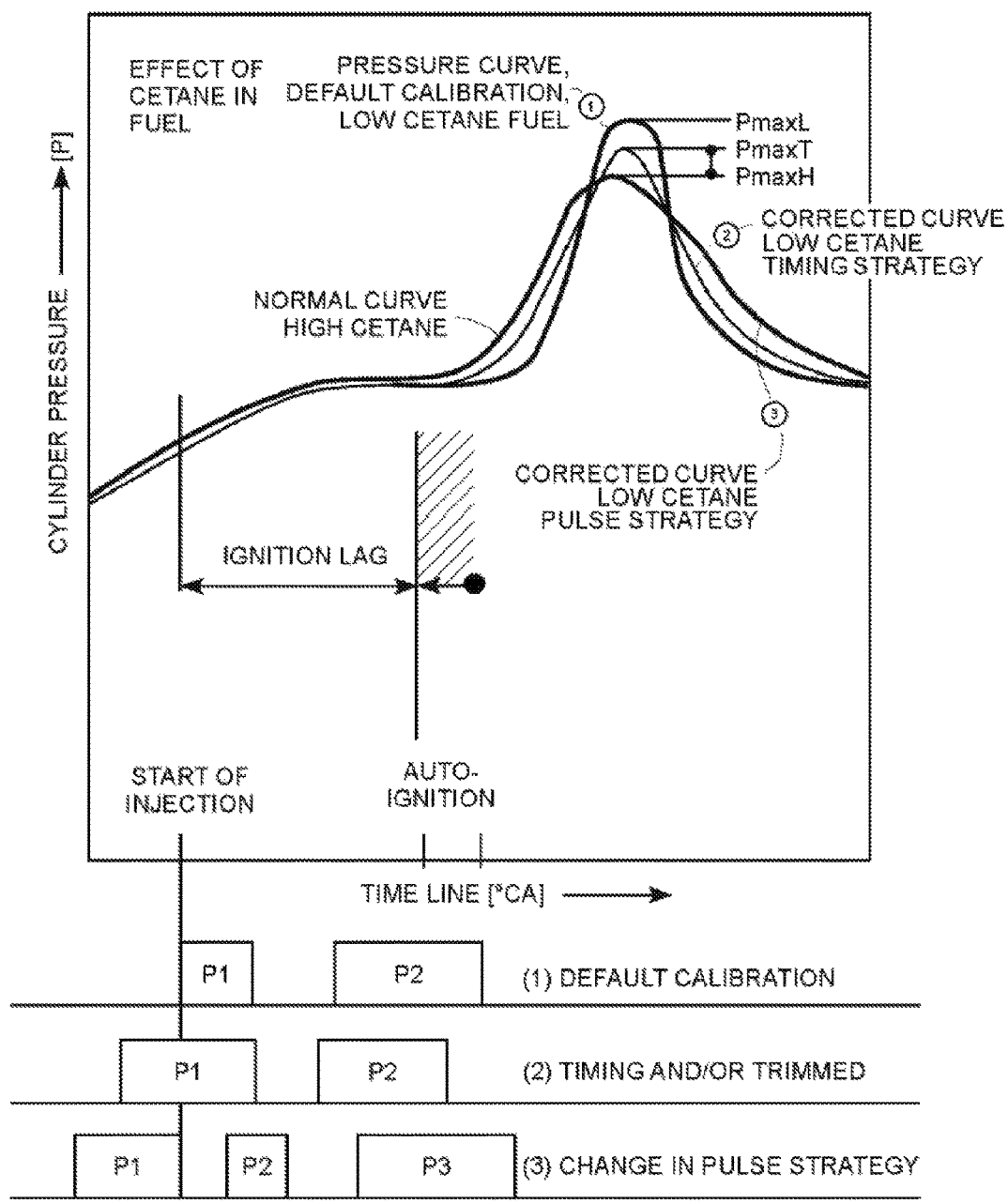
FIG. 14 is a graphic representation of the cetane in fuel with three calibrations that are possible injection strategy changes based on the CCPS feedback loop.

The general approach of the control strategy is to adjust the "timing" and the "trim-quantity per pulse" of the fuel to bring back the pressure curve within the threshold limits of what is considered to be "normal" or "preferred". The present engine 102 will operate with the best efficiency, run quality, noise level, reliability, and less wear when it runs within the prescribed limits as determine by a selected calibration. A normal condition may be as depicted as case (3), default calibration, in FIG. 14.

When abnormal combustion (case 1) is detected by the control system 136 using CCPS 138 data, the immediate response of the control system 136 is to alleviate the $P_{max}$ and dP/dt condition which may cause structural damage to the engine by resonance, or bearing overload in particular. The low cetane conditional effects are of more concern than that of the high cetane condition. By close examination of FIG. 15, the reader may note the dramatic effects of ignition lag, which leads to excessive pressure development (dP/dt) and excessive peak pressure $P_{max}$. The reader should note at the bottom of FIG. 15 that needle lift (and hence fuel quantity) is exactly the same, regardless of fuel quality. The above portions of this diagram indicate how heat release and consequently cylinder pressure development are affected. Threshold limits are developed by surveying fuels of varying Cetane Number (CN), to determine the threshold limits for combustion schemes.

Figure 16:
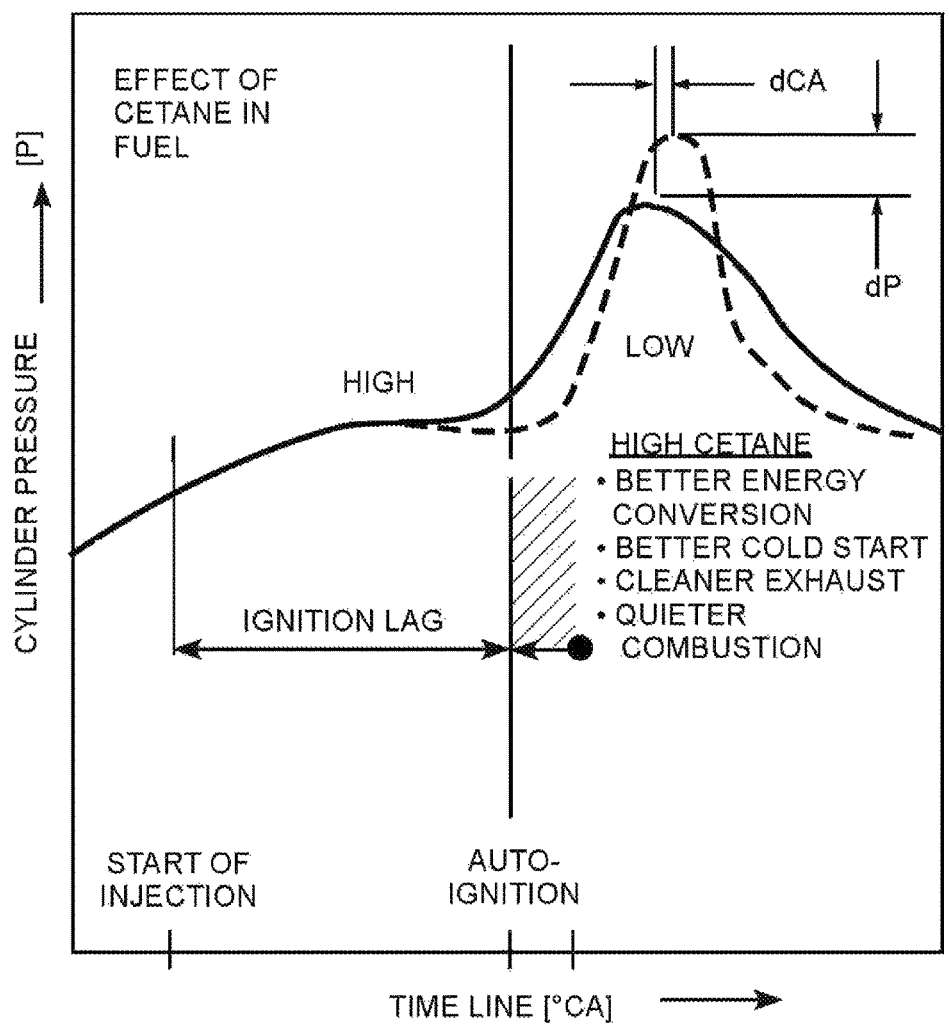
FIG. 16 is a graphic representation of the cetane effect on ignition delay and peak cylinder pressure.
Figure 17:
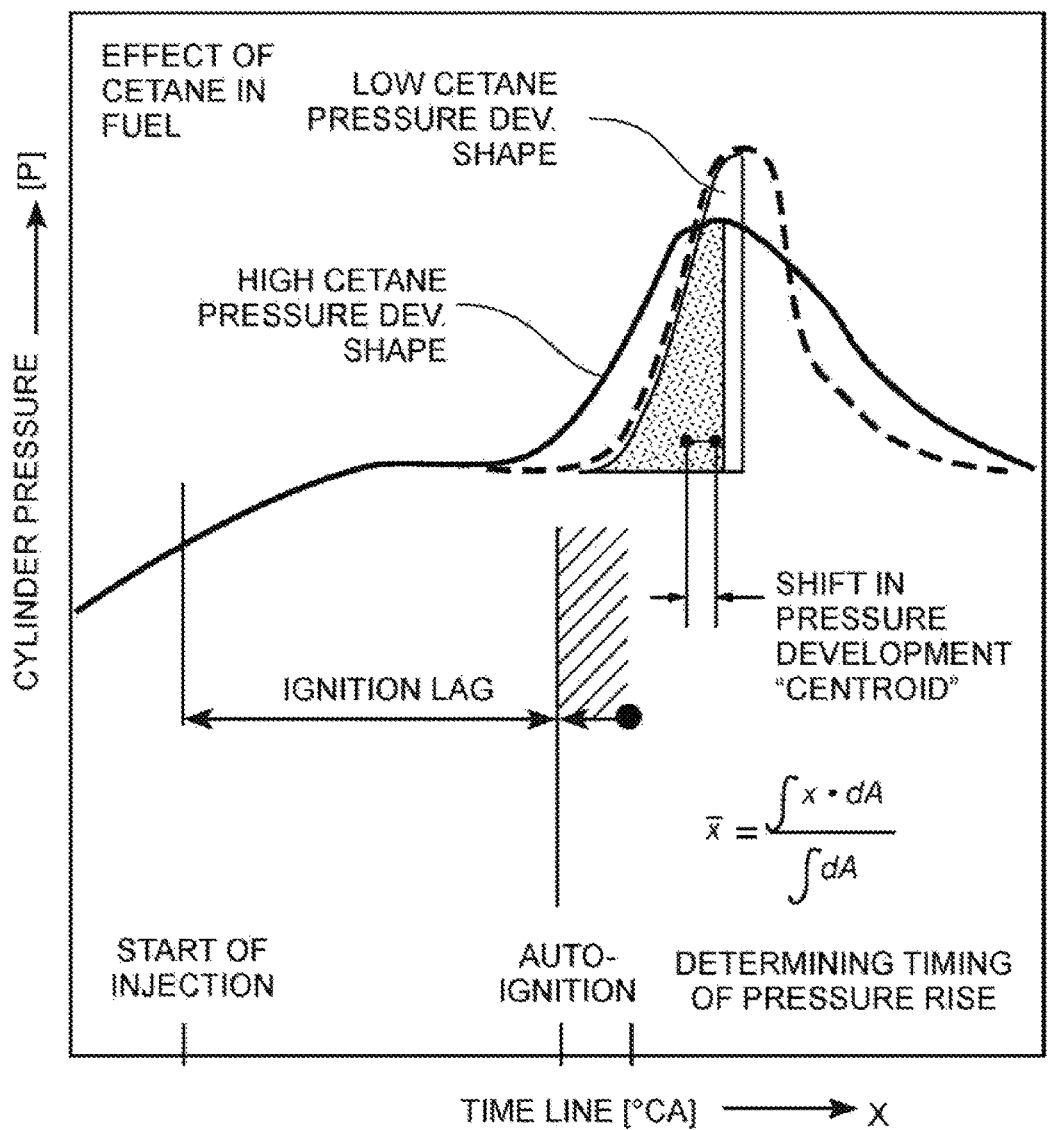
FIG. 17 is a graphic representation of the centroid method to approximate ignition timing shift.

A timing correction initiated by the control system 136 to the injection scheme may be required initially to compensate for the greater ignition delay of low quality fuel. Similarly, an adjustment may be made for high cetane fuel, depending on the limits set for the combustion pressure $P_{max}$ and slope dP/dt. In either case, an adjustment may be contemplated by determining the angular position limits of the Peak cylinder pressure (as in FIG. 16) or by a more sophisticated method to determine the "centroid" of combustion (as shown in FIG. 17).

With a medium quality fuel, a timing adjustment may be all that is required to keep the combustion within the limits specified within the control system. With low cetane fuel the quantity of the injection pulse may need to be trimmed to bias a higher fuel delivery earlier in time. This is termed "trimming" the fuel map. This condition is depicted as case (2 timing and/or trimmed) at the bottom of FIG. 14. In each case, the effect of timing or trimming strategy is "checked" by the control system 136 in real time for either/both $P_{max}$ and dP/dt.

It is recognized that the presence of certain low cetane (bio fuels) in the Jet fuel supply may make it impossible to maintain the required power within the cylinder pressure limits specified. In this particular case, a multi-pulse strategy change may be required as depicted in case (3), to bring the combustion back to what is considered "normal" for high cetane fuel in FIG. 14. A change in strategy may involve using one or a combination of pulse strategies as specified in the lower portion of FIG. 14 or the lower right portion of FIG. 23. The decision as to what pulse strategy will accomplish the task will be determined in testing and calibration activities.

The strategy of the present invention for the integration of CCPS sensors 138 into the control system 136 as an injection modification strategy is contained in the flow chart of FIG. 19 and FIGS. 19a-19d. The functional description of the process is contained in FIG. 20, (S100) Detect cylinder pressure with PSG. The pressure rise per crank angle (ΔP/Δt) is used to compare against the base map. A way to do this, is to integrate the shape into a triangular shape. The centroid of this shape will be calculated afterwards. The peak cylinder pressure will be used to compare as well.

(S101) The actual centroid will be compared to the preferred/normal centroid. The actual peak cylinder pressure will be compared to the normal peak cylinder pressure. If there is a deviation or a phase shaft, a correction is needed.

(S102) If the peak cylinder pressure as well as this pressure rise per crank angle is bigger than normal, a correction is needed to advance the injection and change pulse width.

(S103) Injection timing as well as pulse width will be changed to advance and compensate for the deviation.

(S104) The actual centroid will be compared to the preferred/normal centroid. The actual peak cylinder pressure will be compared to the normal peak cylinder pressure. If there is a deviation or a phase shift, a correction is needed.

(S105) IF the peak cylinder pressure as well as this pressure rise per crank angle is bigger than normal, a correction is needed to advance the injection and change pulse width. If the peak cylinder pressure as well as this pressure rise per crank angle is smaller than normal, advance to step 205.

(S106) Injection strategy will be changed, by adding an additional pulse, to fine trim the timing as well as pulse width to advance and compensate for the deviation.

(S107) The actual centroid will be compared to the preferred/normal centroid. The actual peak cylinder pressure will be compared to the normal peak cylinder pressure. If there is a deviation or a phase shift, a correction is needed.

(S108) If the peak cylinder pressure as well as this pressure rise per crank angle is bigger than normal, a correction is needed to advance the injection and change pulse width. If the peak cylinder pressure as well as this pressure rise per crank angle is smaller than normal, advance to step 208.

(S109) Injection timing as well as pulse width will be changed to advance and compensate for the deviation.

(S202) If the peak cylinder pressure as well as this pressure rise per crank angle is smaller than normal, a correction is needed to delay the injection and change pulse width.

(S203) Injection timing as well as pulse width will be changed to delay and compensate for the deviation.

(S204) The actual centroid will be compared to the preferred/normal centroid. The actual peak cylinder pressure will be compared to the normal peak cylinder pressure. If there is a deviation or a phase shaft, a correction is needed.

(S205) If the peak cylinder pressure as well as this pressure rise per crank angle is smaller than normal. A correction is needed to delay the injection and change pulse width. If the peak cylinder pressure as well as this pressure rise per crank angle is bigger than normal, advance to step 105.

(S206) Injection strategy will be changed, by adding an additional pulse to fine trim the timing as well as pulse width to delay and compensate for the deviation.

(S207) The actual centroid will be compared to the preferred/normal centroid. The actual peak cylinder pressure will be compared to the normal peak cylinder pressure. If there is a deviation or a phase shift, a correction is needed.

(S208) If the peak cylinder pressure as well as this pressure rise per crank angle is smaller than normal. A correction is needed to delay the injection and change pulse width. If the peak cylinder pressure as well as this pressure rise per crank angle is bigger than normal, advance to step 108.

(S209) Injection timing as well as pulse width will be changed to delay and compensate for the deviation. The following paragraphs amplify the functional description.

With the CCPS 138 measuring the cylinder pressure, the control system 136 can determine dP/dt. A novel methodology for this is proposed using a centroid to measure timing phase shift. This centroid point in relation to the crank angle as well as $P_{max}$ is being used in the software to compensate for the different qualities of fuel. The phase shift is determined with the centroid methodology and compared it to a base map.

Once the software of the control system 136 determines if the engine combustion is abnormal (i.e. high or low cetane fuel quality), the control system 136 software corrects for this with timing and/or fuel quantity trimming of the base injection map. If the $P_{max}$ as well as dP/dt is higher than the corresponding parameters of the base map, retarding of the fuel injection and trimming of the pulse width is necessary. If the values show a lower reading, a delay will be needed. In either case, one of these strategies will change the $P_{max}$ and dP/dt to acceptable level within selected threshold limits. To get to the desired values, timing and trimming of the fuel injection quantity will be done and evaluated in the next step.

If the threshold value is not attained, the software will determine, once again, if the values are still too high or if perhaps the correction overshot the desired value. In these cases the software will opt to change the injection strategy and add an additional pulse to the fuel injection scheme. This is done to fine tune the corrections and limit overshooting. The software will perform a correction (including the added pulse) in timing and trimming of the pulse.

Figure 19:
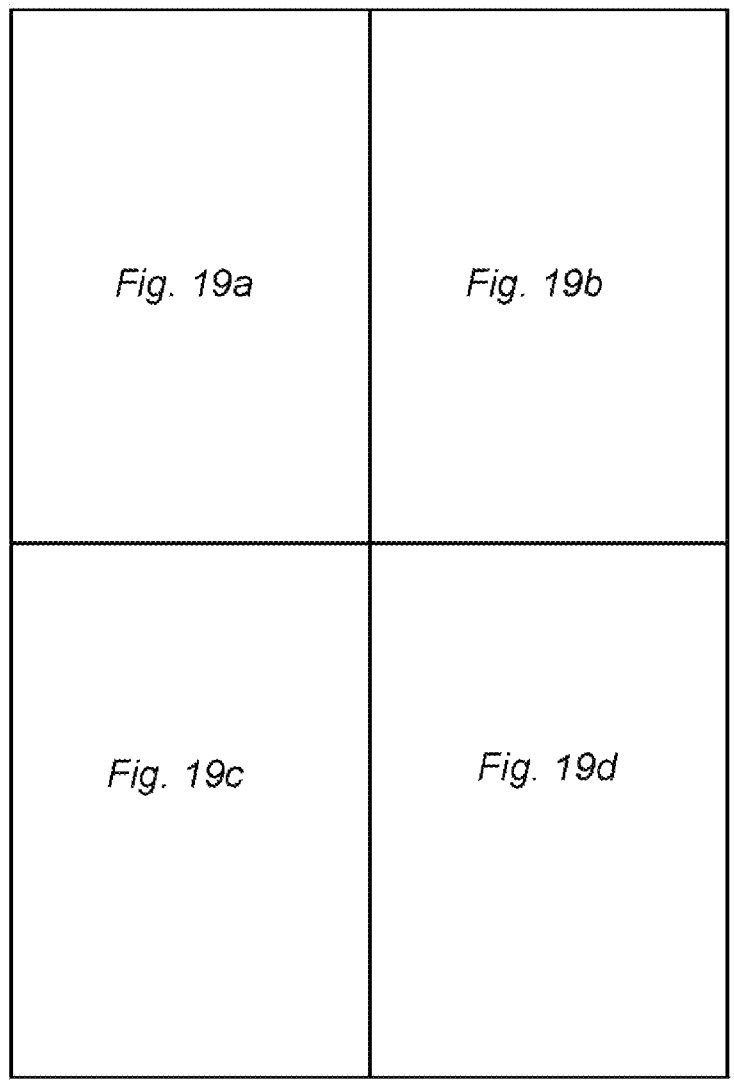
FIG. 19 is a diagram indicating interaction of FIGS. 19a-19d.
Figure 19A:
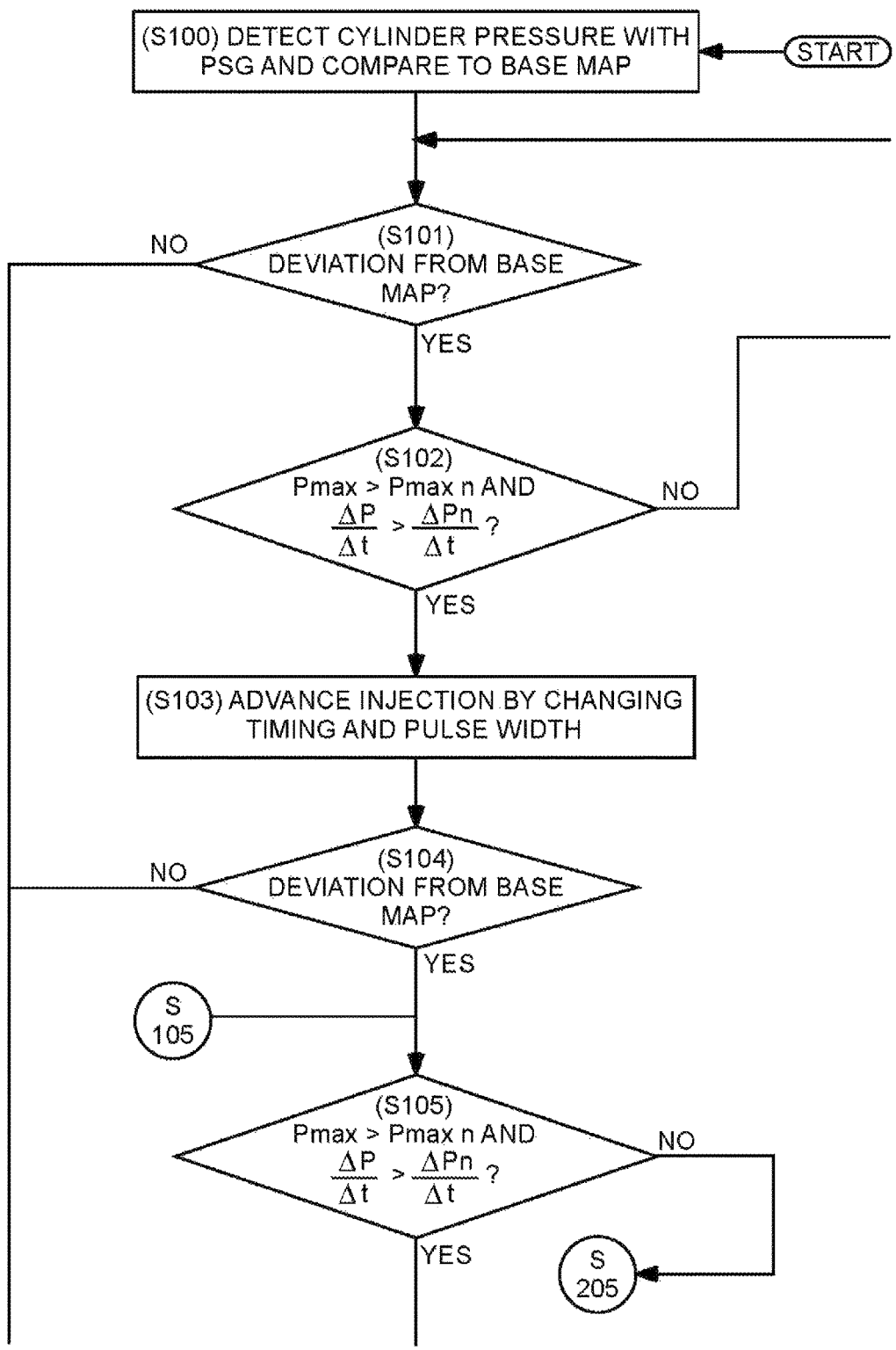
FIGS. 19a-19d is a flow diagram for CCPS data integration in control system software.
Figure 19B:
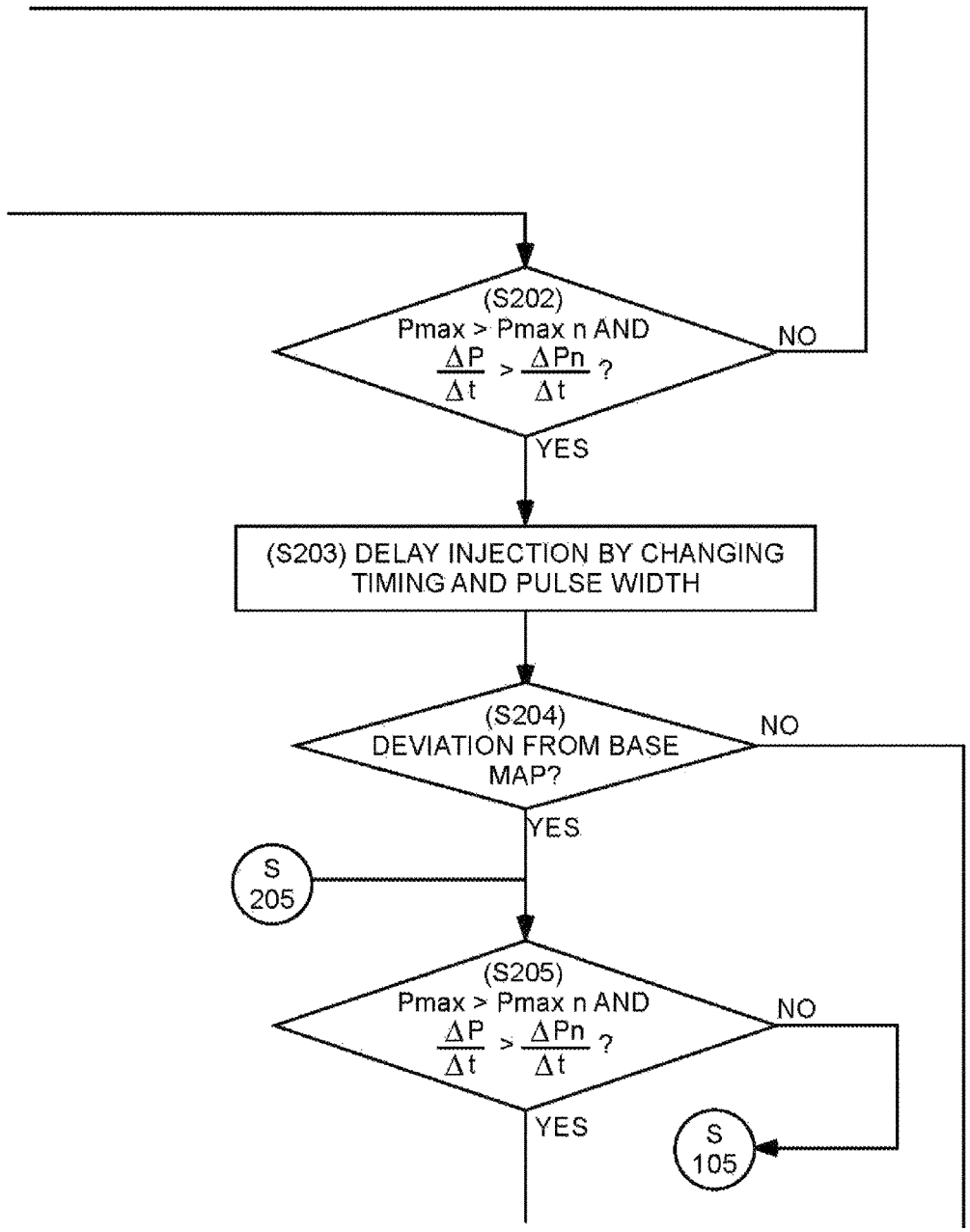
Figure 19C:
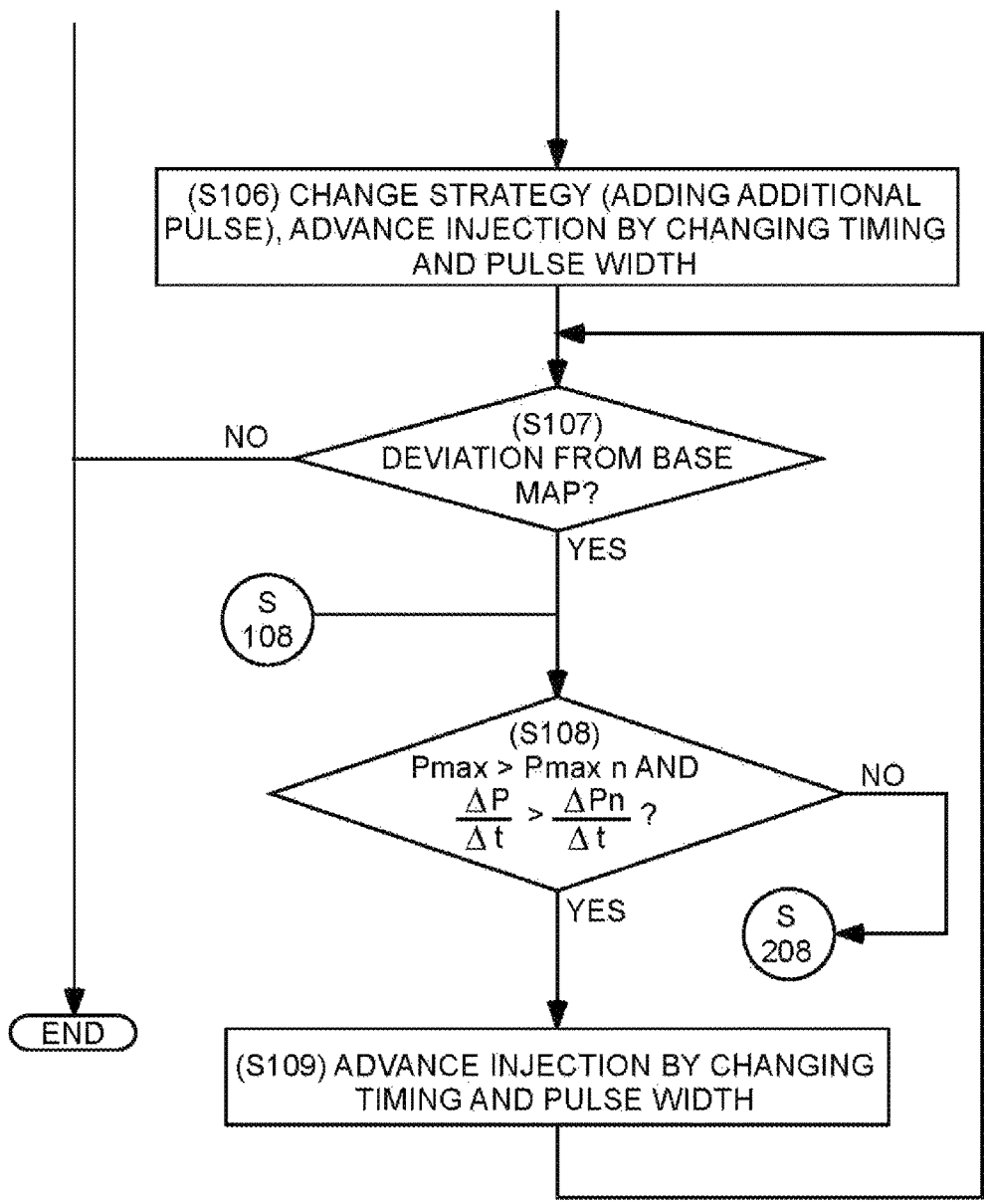
Figure 19D:
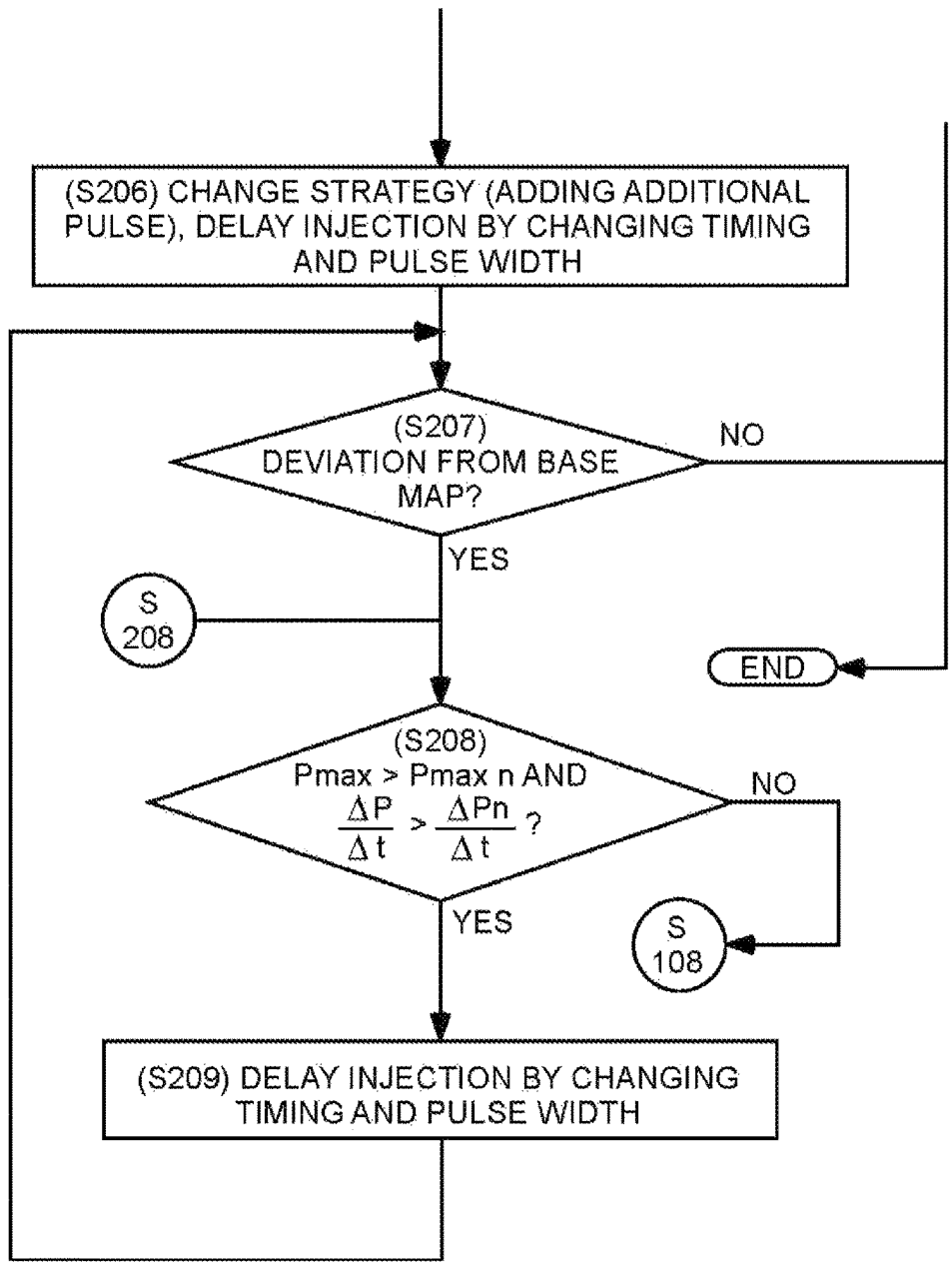
Figure 20:
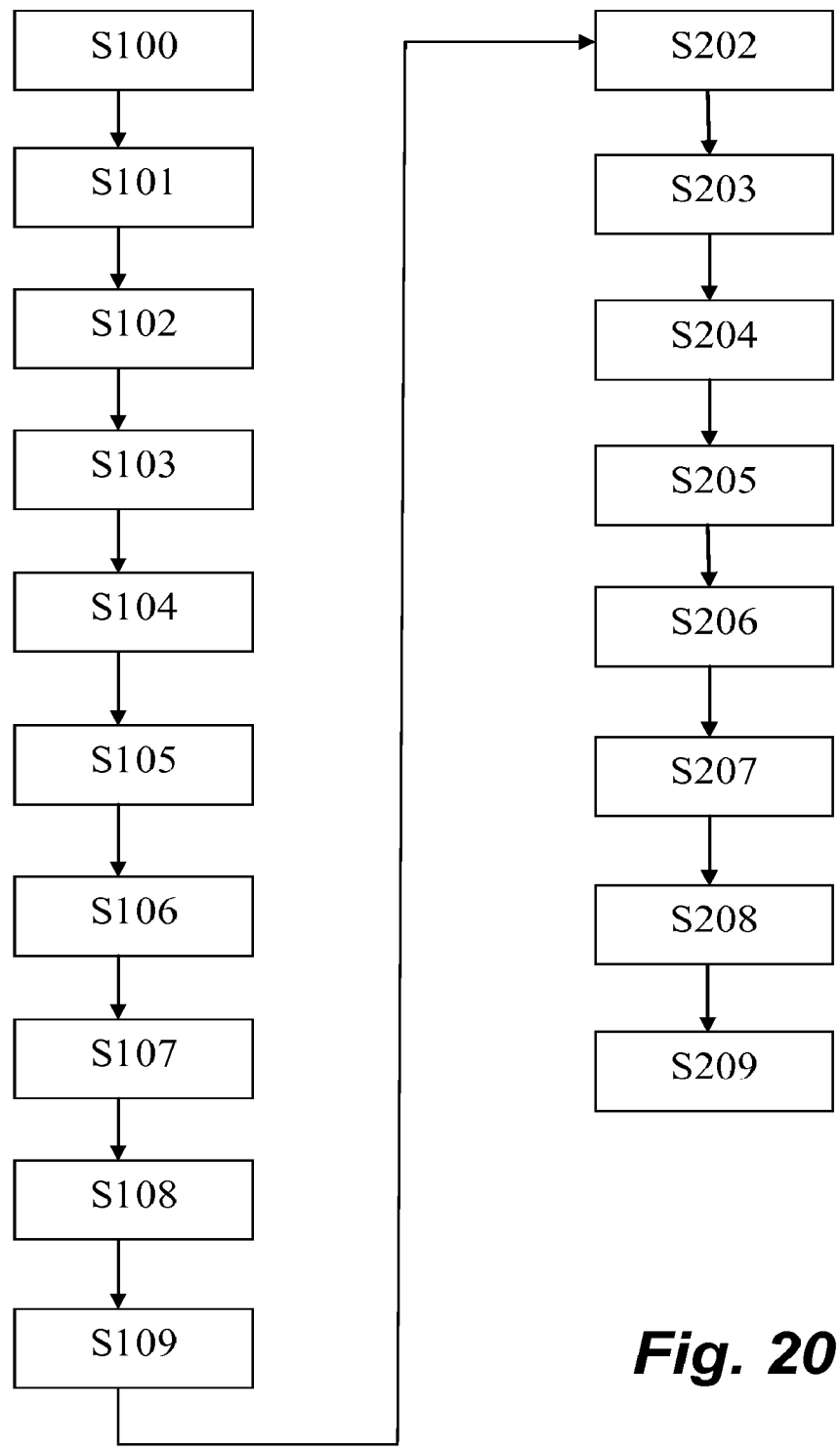
FIG. 20 is a diagram of the steps of the control system software of FIGS. 19a-19d.

The software will check if the corrections are done within the threshold values and will determine if the values are too high or too low. According to this calculation, changes in timing and trimming of the pulse width will be done. This process will continue of in a loop until the fine tuning reached the desired values. In this case the engine can run on its base map and potential damage is avoided. FIG. 19 shows a detailed flowchart of the control software of the control system 136.

Understanding the Aircraft Driveline

One of the keys to understanding a driveline is to understand the "natural frequency" of the system. Most engine drivelines have very little effective damping, unless a particular "damper" is designed in the system. Most crankshafts, gears, propeller shafts are made of steel which is crystalline in nature. Steel has a very low internal damping, and is therefore susceptible to resonance.

Resonance is a phenomenon that is characterized by a systems' inability to damp periodic energy inputs that may result in a harmonic excitation of the system. Left unchecked, the system may oscillate until imminent failure is likely.

Any driveline system will have natural frequencies that are characterized by the stiffness/weight of the system. The resonant frequency of the system must be determined in order to determine which harmonics to avoid in the operating range of the engine. Once the critical frequencies are known, the engine speeds that might be susceptible to resonance can be predicted.

Using Software to Create Torsional Vibration Models

The first step to take in performing a dynamic analysis is to accurately model the dynamic system is simplified by using packages that work with the CAD systems to create a one dimensional torsional model. The propeller cannot be ignored as a part of the torsional evaluation. If necessary, the one dimensional model must be modified to represent the flexible blade of the propeller.

With system mass and spring stiffness known, software or the Holzer tabular method may be used to determine the resonant frequency and vibrational mode shape. The calculated frequencies and mode shapes are useful in determining at which speeds an engine may be susceptible to resonance.

In the past, resonant conditions were "placarded" as danger zones to stay away from in normal aircraft operation. The pilot had to pay special attention to avoid operation in these areas to avoid engine damage.

Altering the Harmonic Content of the Gas Torque

In the case of the Diesel aircraft engine 102, there exists ability to use the CCPS 138 data and the common rail electronic injector 126 to "rate shape" the pressure curve to ensure that resonance phenomena is minimized as the engine speed changes to meet flight regimes.

Figure 27:
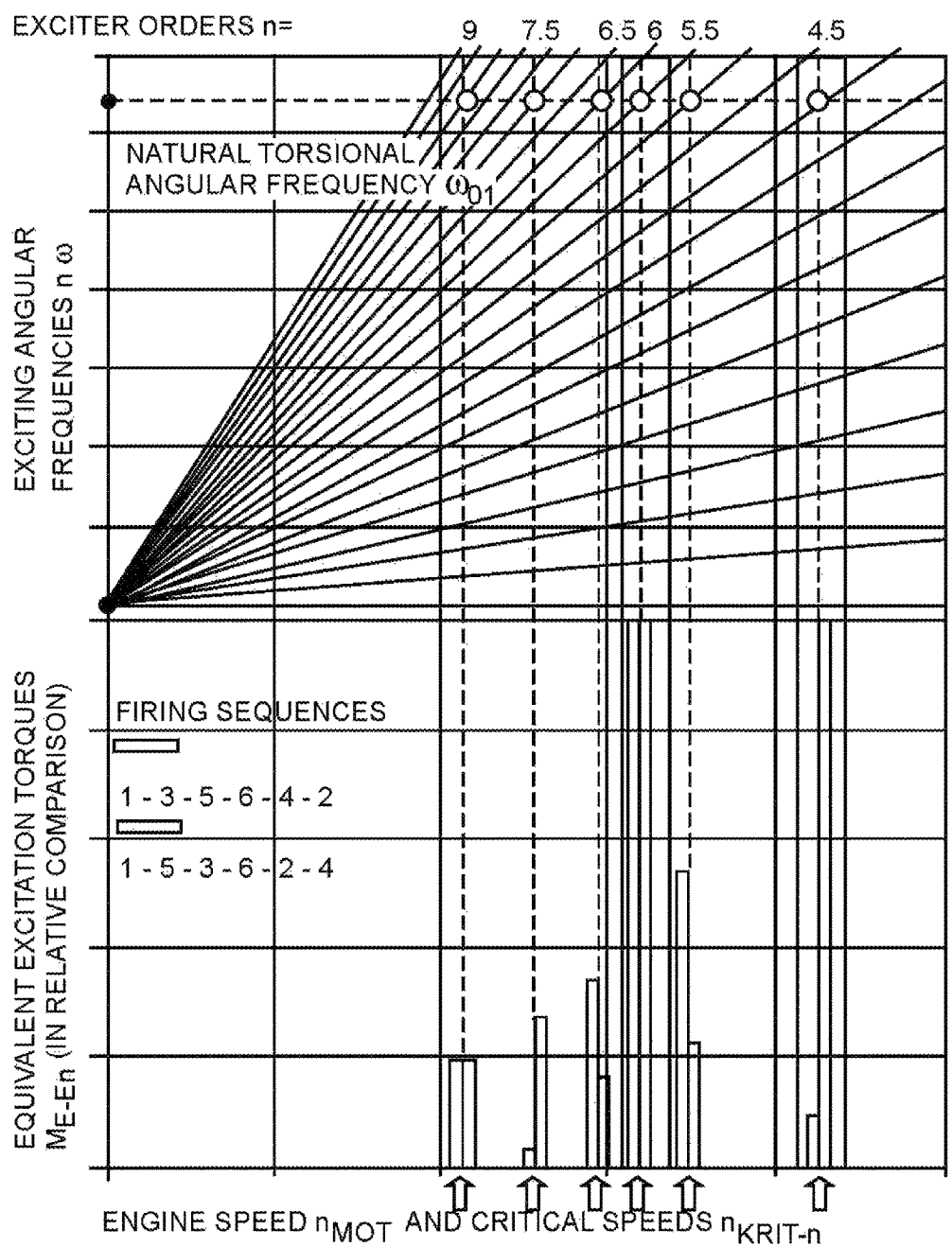
FIG. 27 is a graphic representation of an engine combustion characteristics to determine if resonance is likely to be present.

At various speeds, different harmonic forcing function orders must be present to cause resonance. The actual amplitude of the resonance is a function of how much damping is present in the engine system. There may be a natural frequency ($\omega_{01}$) to be avoided. (See FIG. 27).

At resonant speeds, the A-E pulse weighting could be altered to minimize the harmonic content of the gas tangential force produced. This would create a gas harmonic that would be more "soft" to the natural frequency at that particular critical speed. How to attain that level of control is what the control system 136 utilizing CCPS 138 data permits.

The goal is to come up with a calibration that is optimized from an efficiency perspective. To that end, a modern electronic injection system allows selection of a "recipe" that gives the desired "shape" to a pressure curve. Fourier analysis is used to determine what the gas force curve is made of. Once decomposed, the gas force is determined to be "comprised" of various elements that when added will create the exact shape of the gas torque curve.

Figure 21:
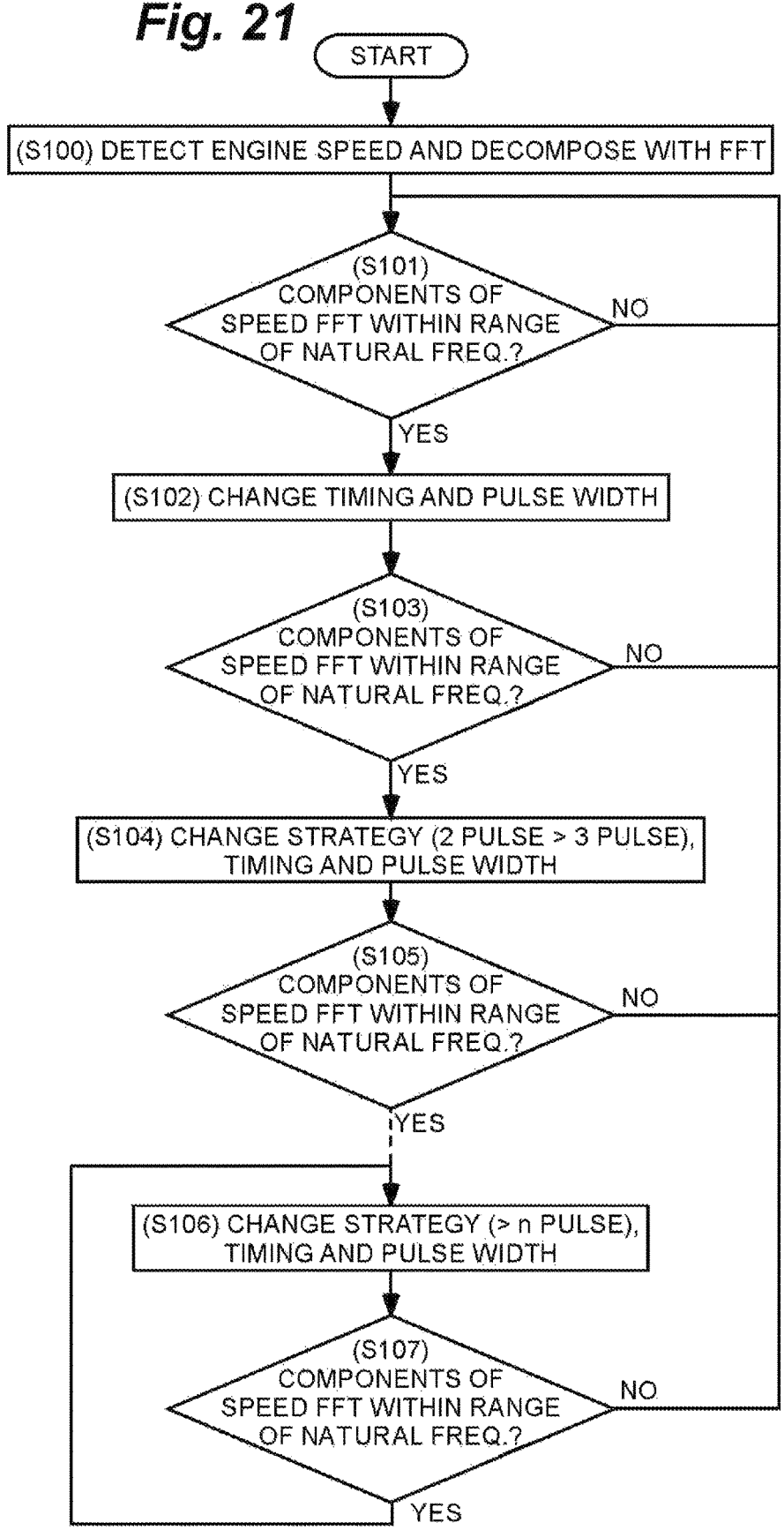
FIG. 21 is a flow diagram for injection strategy modification based on drivetrain frequencies with speed feedback for a crankshaft sensor.
Figure 22:
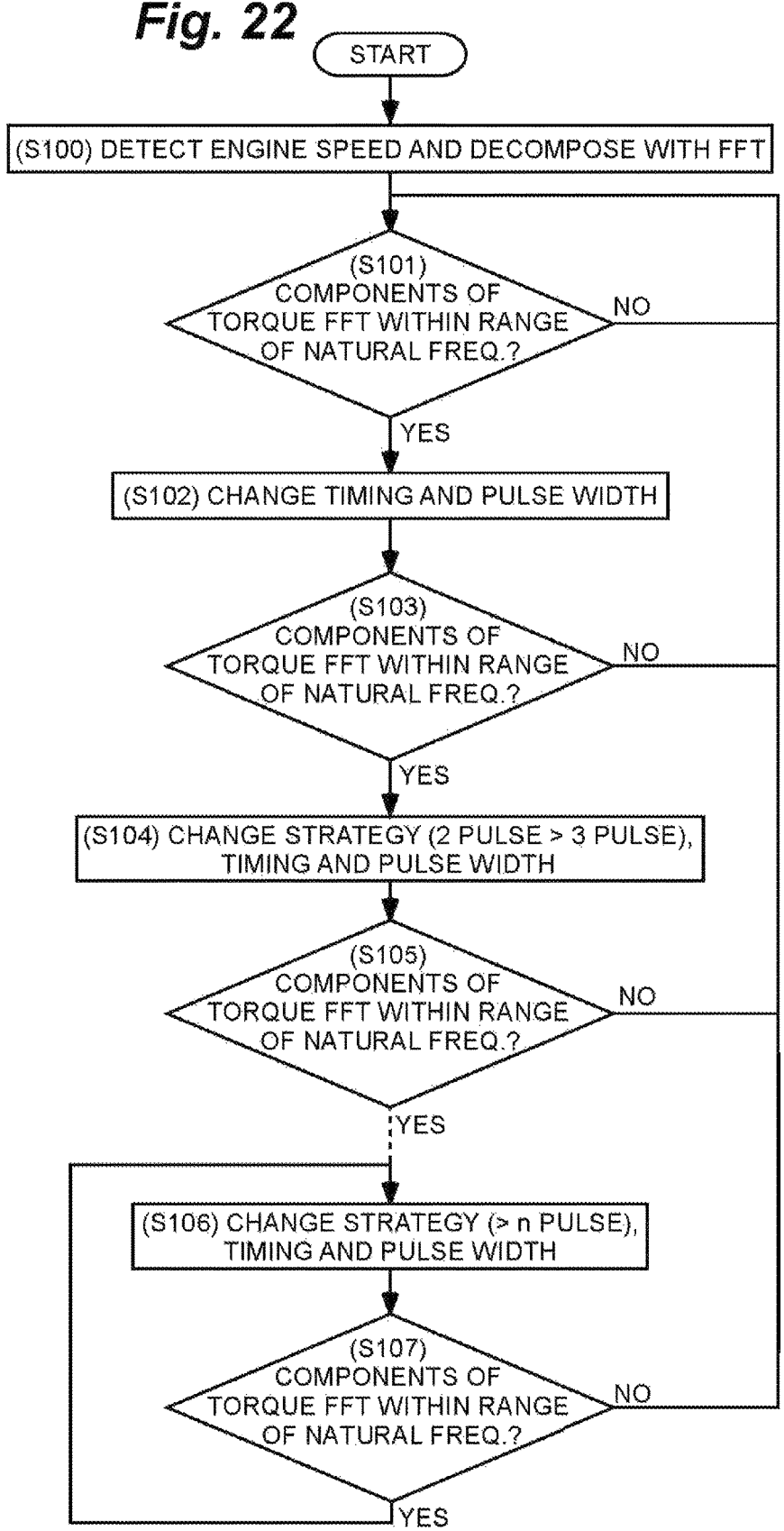
FIG. 22 is a flow diagram for injection strategy modification based on drivetrain frequencies with torque feedback from coupling torque sensor.

FIGS. 21 and 22 show two strategies to control the composition of the gas torque harmonics by implementation of various fueling strategies. At a given speed different orders may cause resonance at a variety of engine speeds. At the low speed regime, a certain excitation force might cause resonance, whereas in the high speed regime, a different order may be more likely to cause resonance. With the capabilities of multi-pulse fueling schemes such as those proposed in FIG. 23, there are no "typical" amplitudes of gas torque harmonics.

In the past it has been possible to list what is "typical" in terms of gas torque harmonic content. There is however, nothing "typical" for a Diesel engine with all of the possible fueling combinations offered by the modern multi-pulse system of the present invention. Today, injectors are capable of a 5-pulse strategy, but it is hard to predict what level of control is contemplated for the future. Even with a 5-pulse strategy, there are virtually infinite ways to deliver the fuel to the cylinder system, and the result is a gas torque curve which can be manipulated by the control system 136 to "shape" the pressure curve development in a fashion that does not promote drive line (propeller, crankshaft, accessory) vibrations.

The control system 136 of the present invention utilizing CCPS 138 technology is a vital piece of equipment to be able to check the pressure development within each cylinder system. With a multi-cylinder engine, it is even possible to tune different cylinders to provide a varying contribution to the overall torque signature. With a strategy like this, the harmonic characteristic can be tuned for several objectives.

Using the Control System as a Maintenance Tool and Performance Indicator

The control system 136 of the present invention utilizing CCPS 138 technology is particularly useful as a periodic maintenance tool for the aircraft application, where reliability is of foremost concern for the safety of the pilot and crew. Since aircraft engines spend a disproportionate amount of time sitting, they may be susceptible to some types of failure modes not seen in automotive applications.

Figure 24:
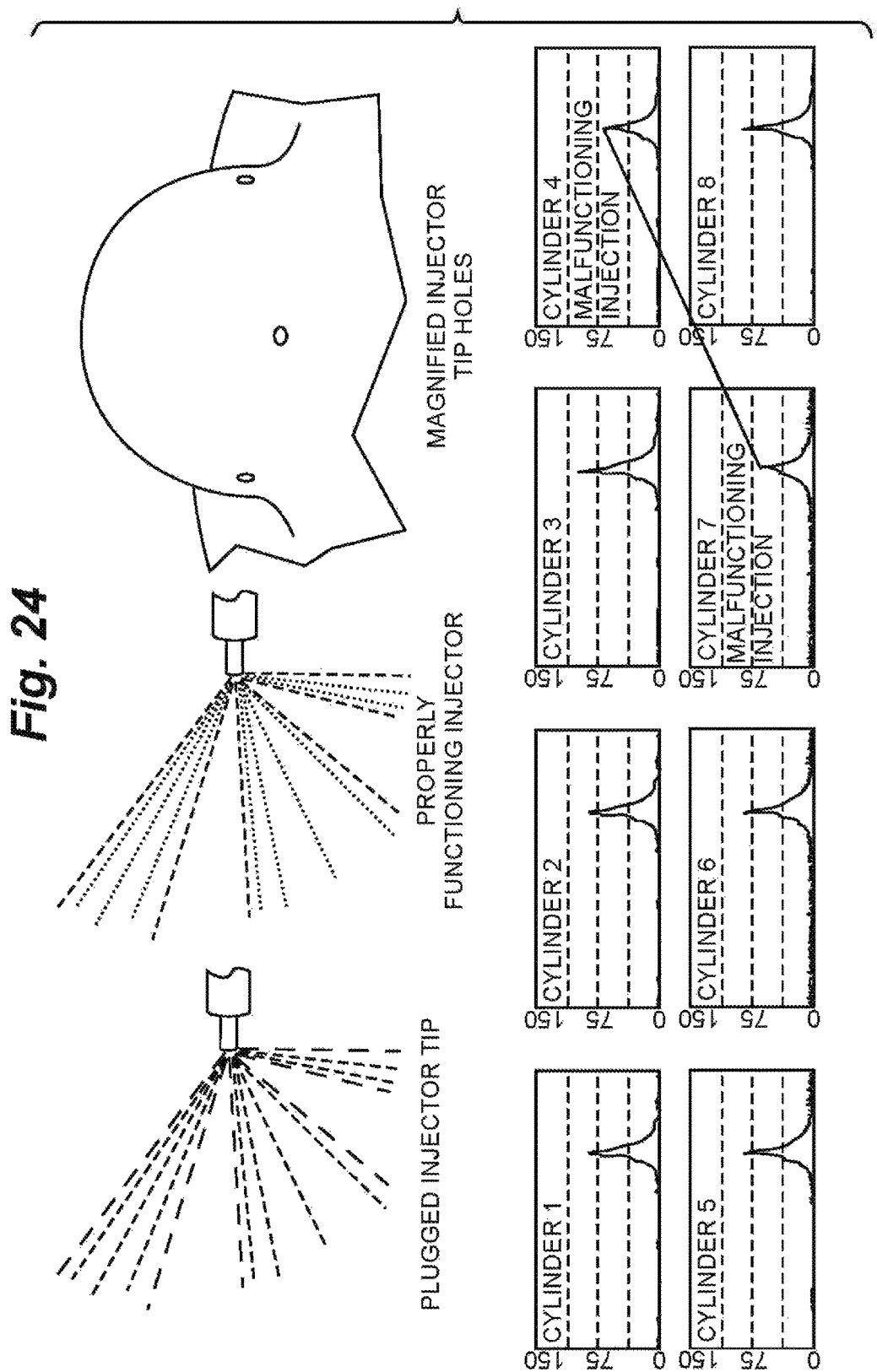
FIG. 24 is a graphic depiction of a detecting injector malfunctions with the CCPS.

One use of the control system is to monitor the relative conditions of all cylinders in an engine. FIG. 24 shows an actual test condition experienced during calibration activities of the engine 102. In this particular test, all eight cylinders 120 were sent the same electronic signal by the control system 136 which should have (in theory) delivered the same amount of fuel to each cylinder. The actual cause of the two underperforming cylinders was sonic phenomena (water hammer) in the fuel rail 128 caused two of the eight injectors to indicate a different combustion (lower peak pressure) than the other cylinders. Without the control system 136, it would not have been known to pursue and solve this piping problem in the fuel rail 128. In real world conditions, the control system 136 informs the pilot that a cylinder 120 or cylinders 120 was/were misfiring, and would warrant attention. The same strategy would help in determining a damaged or plugged injector as shown in the top portion of FIG. 24, depicting the magnified tip of an injector 126.

The control system 136 can be used to "balance the contribution" of all cylinders 120 when running. In another scenario, the control system 136 can be tuned to provide maximum output at a maximum cylinder pressure.

In extreme cases, an underperforming cylinder 120 could set the dynamic system into resonance, and may damage the engine if left unchecked. The pilot's only indication in systems without the control system of the present invention would be an undefined "rough running" condition that the pilot may/may not sense, depending on the mechanical experience of the pilot.

Even if the aforementioned "rough running condition" was not damaging from a dynamic perspective, the pilot may be down in power. While this may not be significant in lightly loaded, low altitude take-off conditions, the condition may be lethal in high altitude, warm ambient temperature take-off conditions.

The control system 136 of the engine has the ability to communicate real time performance data to the pilot for any meteorological or altitude condition he finds himself in. By computing the mean pressure over the cycle for each cylinder, and adding the contributions up, the pilot has in-effect a built-in dynamometer in the control system 136 that will indicate maximum performance at run-up for every planned take-off. This information is a groundbreaking performance tool for flight planning made possible by the control system 136 of the present invention.

Figure 25:
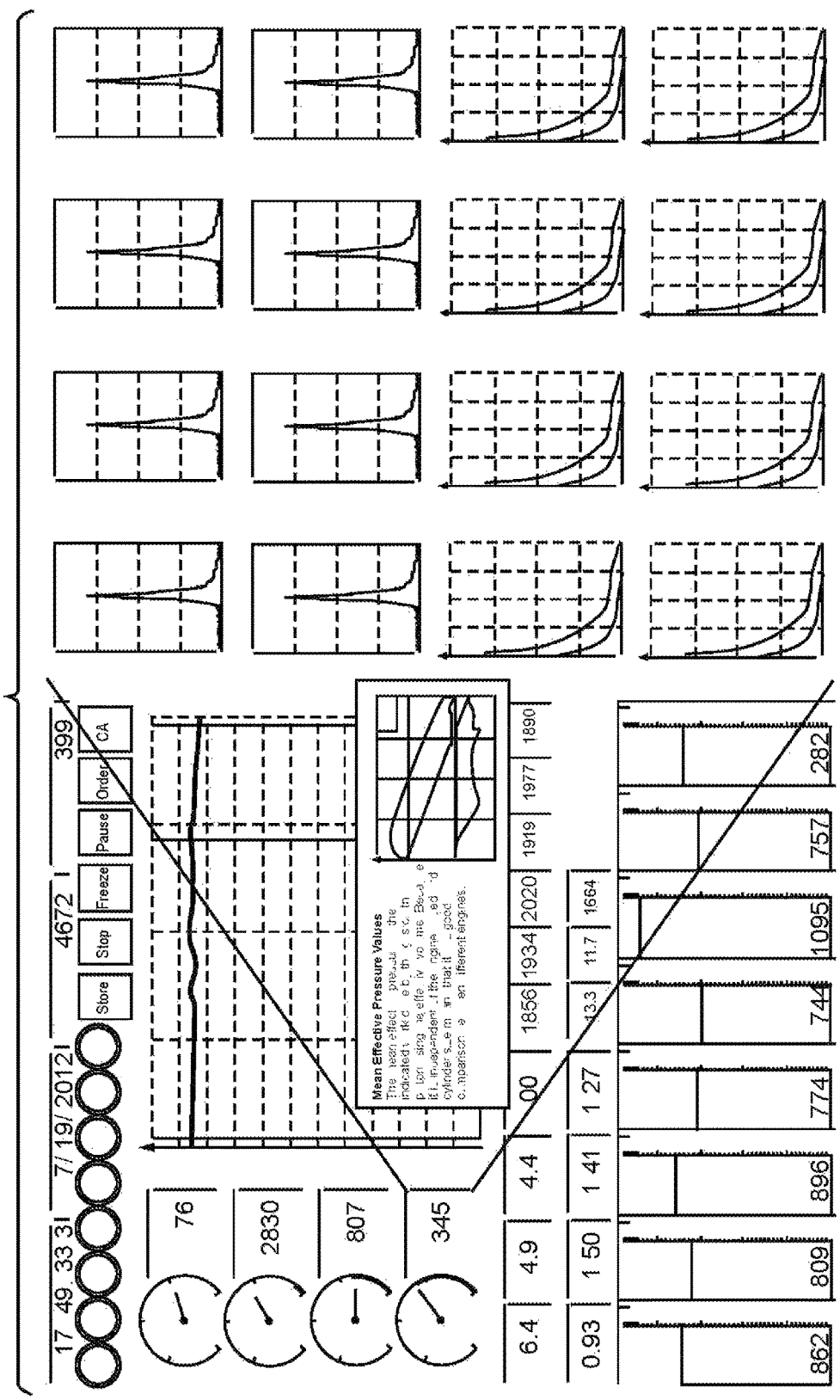
FIG. 25 is a graphic depiction of an EPS calculated IMEP (Gas Horsepower) with CCPS equipment eliminating guesswork.

The engine 102 of the present invention has a direct reading of engine performance based on an Indicated Mean Effective Pressure (IMEP) value as determined by the control system using data from the CCPS sensor. This value over time will indicate the actual expansion work done by the combustion gas, and hence an accurate measure of available engine power for the weather conditions of the day. This term is defined as in FIG. 25.

Figure 26:
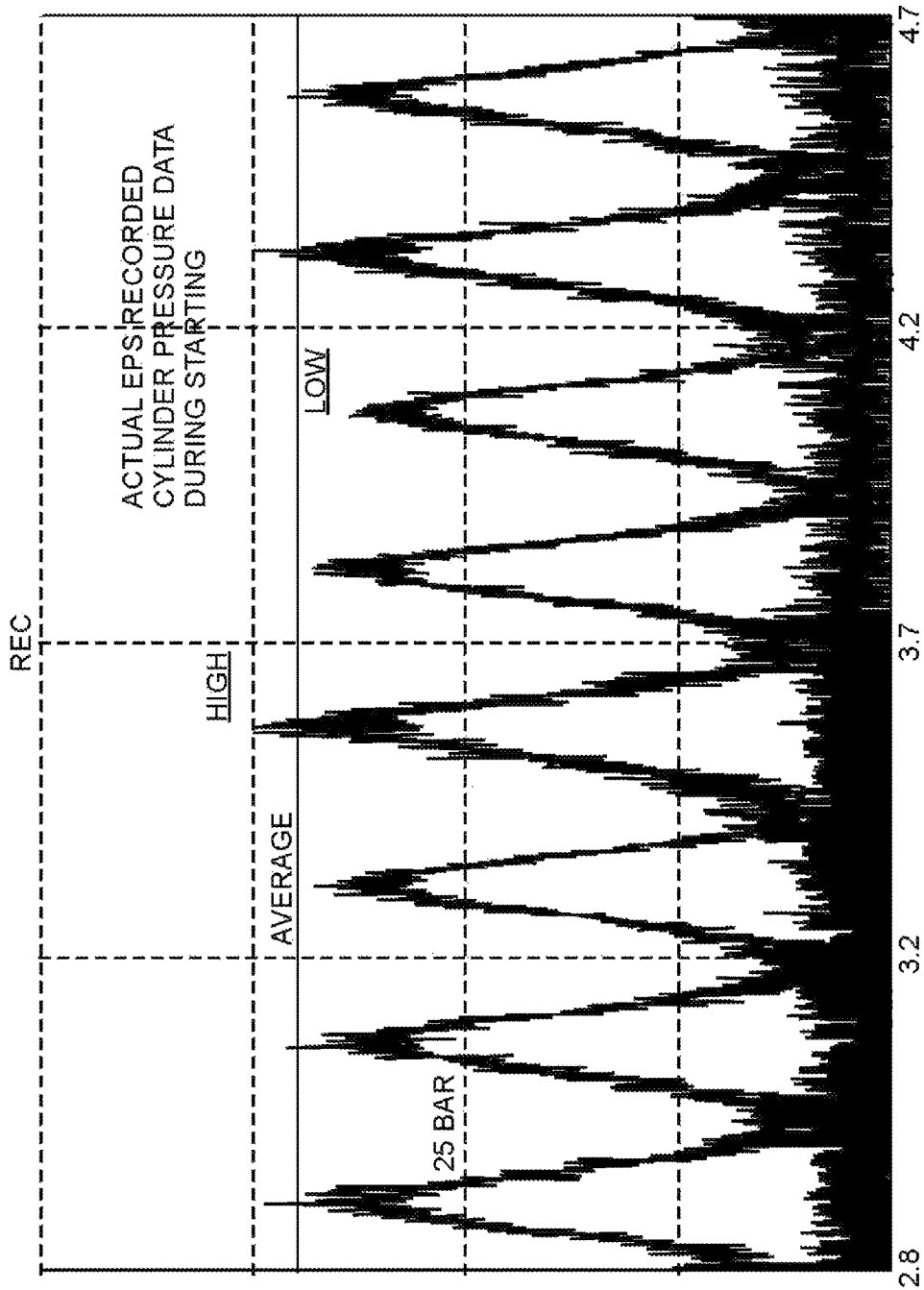
FIG. 26 is a graphic depiction of a performing compression test on all cylinders with CCPS during starting.

The aforementioned combustion measurement is not the only useful application of the control system 136. With the control system 136, the pilot has the ability to check the compression of every cylinder for every start of the engine. For example, a stuck valve would show up immediately as a condition that would "warrant further inspection before takeoff". This is possible due to the ability to scan cranking pressures while starting. See FIG. 26.

A number of other possible Items can be determined as well by the control system 136, including (but not limited to):

Stuck intake/exhaust valves
Deteriorated valve seat
Broken or worn piston rings
Bad or leaking cylinder gasket
Leaking injector (hydro-lock impending)
Scuffed cylinder wall In any or all of these cases, the control system 136 is a useful diagnostic and/or safety advantage for the pilot.

Knowing the "health" of each cylinder in the engine system is a novel approach to understanding engine reliability and flight worthiness.

Using the Control System 136 to Control Turbocharger Switching

CCPS 138 technology is used by the control system 136 to control the switching of turbochargers 142. The control system can use the actual combustion data to determine the character of the combustion curve and when to "activate" a secondary turbocharger 142. Since "injection delay" is an indication of the air swirl in the combustion chamber, a slow delay would indicate lack of mixture motion. This threshold can be used to trigger the secondary turbocharger switching of a waste gate.

Figure 18:
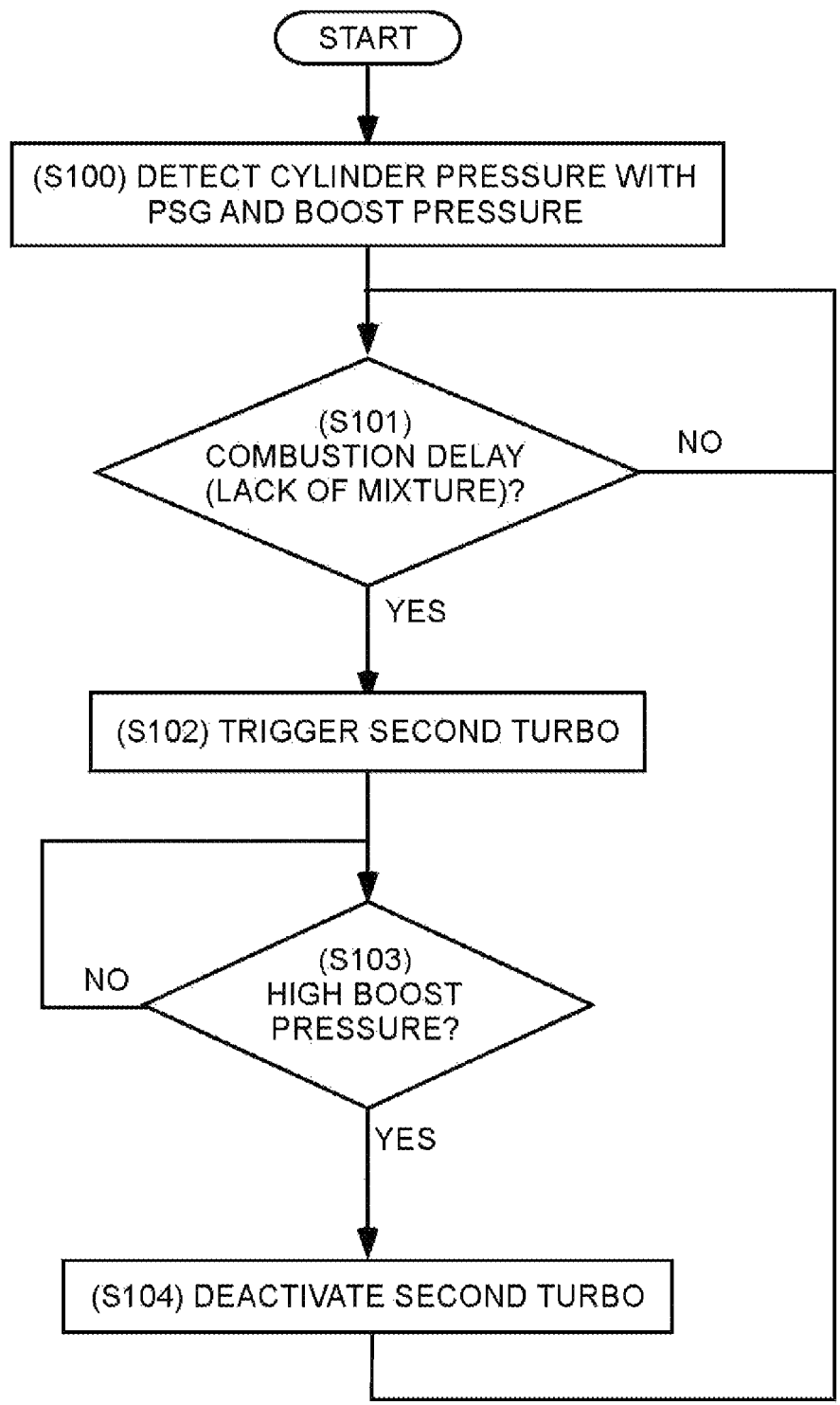
FIG. 18 is a flow diagram for injection strategies for low power settings.

Further, the control system 136 uses CCPS 138 data to calculate the pressure rise per crank angle (dP/dt) and compare its value against the base map. A slow delay would indicate a slower pressure rise per crank angle. The lack of mixture can be detected with a lower maximum cylinder peak pressure. This is caused by an incomplete combustion of fuel. These two parameters assist in pinpointing the operating conditions. In the case where more air is desired, and the secondary (high pressure) turbocharger 142a (of FIG. 11) will be triggered. The secondary turbocharger 142a will charge the combustion chambers 122 with additional air to create a better mixture swirl. By measuring the boost pressure, the control system 136 can determine when to switch off or how to trim the second turbocharger 142a, to keep each system operating near its optimum efficiency island. FIG. 18 shows a flowchart of the strategy embedded in the control system 136.

The invention claimed is:

1. A control system for an aero diesel drive assembly configured to affect a combustion control strategy to alter a torque signature of an engine of the drive assembly to avoid forcing a response from one or more known natural resonance frequencies of the drive assembly, the control system comprising:
a sensor configured to sense at least one of a rotational speed and torque output of the engine;
a plurality of combustion chamber pressure sensors, each of the combustion chamber pressure sensors configured to sense a pressure within a corresponding plurality of combustion chambers of the engine;
a control module configured to utilize data sensed by the sensor to determine if the engine is operating within an operational range corresponding to the one or more known natural resonance frequencies of the drive assembly, and if so, manipulate a fuel injection pulse strategy of the engine to affect a change in pressure development to tune a harmonic content of the combustion event to avoid the one or more known natural resonance frequencies of the drive assembly wherein the control module is further configured to analyze pressure curves within the plurality combustion chambers represented by the pressures sensed within each of the respective plurality of combustion chambers over time; and
a plurality of fuel injectors in communication with the control module, configured to implement the manipulated fuel injection pulse strategy wherein manipulation of the fuel injection pulse strategy alters the shapes of the respective pressure curves to limit excessive pressure development and excessive peak pressure to avoid the one or more know natural resonance frequencies of the drive assembly.

2. The control system of claim 1, wherein manipulation of the fuel injection pulse strategy alters at least one of the timing, pulse width, and number of pulses of injected fuel.

3. The control system of claim 1, wherein manipulation of the fuel injection pulse strategy affects at least one of a peak cylinder pressure, breadth, and timing of combustion within the engine.

4. The control system of claim 1, wherein the fuel injection pulse strategy for a plurality of combustion chambers of the engine can each be manipulated independently from one another.

5. The control system of claim 1, wherein the drive assembly includes an engine, transmission, and propeller.

6. The control system of claim 1, wherein the control module is further configured to serve as a predictive maintenance tool as an aid in determining fuel injector degradation.

7. The control system of claim 1, wherein the control module is further configured to calculate and Indicated Mean Effective Pressure (IMEP) of at least one of the engine and each of the cylinders contribution as an indication of engine performance.

8. An aircraft drive assembly configured to tune combustion chamber fuel injection for the purpose of avoiding one or more known natural resonance frequencies of the aircraft drive assembly, the aircraft drive assembly comprising:
an aero diesel engine having a plurality of combustion chambers;
a transmission operably coupled to the aero diesel engine;
a propeller operably coupled to the transmission; and
a control system including,
a sensor configured to sense a rotational speed and torque output of the engine;
a plurality of combustion chamber pressure sensors, each of the combustion chamber pressure sensors configured to sense a pressure within a corresponding plurality of combustion chambers of the engine;
a control module configured to utilize data sensed by the sensor to determine if the engine is operating within an operational range corresponding to the one or more known natural resonance frequencies of the aircraft drive assembly, and if so, manipulate a fuel injection pulse strategy to affect a change in pressure development within the combustion chambers wherein the control module is further configured to analyze pressure curves within the plurality combustion chambers represented by the pressures sensed within each of the respective plurality of combustion chambers over time; and
a plurality of fuel injectors in communication with the control module, configured to implement the manipulated fuel injection pulse strategy wherein manipulation of the fuel injection pulse strategy alters the shapes of the respective pressure curves to limit excessive pressure development and excessive peak pressure to avoid the one or more know natural resonance frequencies of the drive assembly.

9. The control system of claim 8, wherein manipulation of the fuel injection pulse strategy alters at least one of the timing, pulse width and number of pulses of injected fuel.

10. The control system of claim 8, wherein manipulation of the fuel injection pulse strategy affects at least one of a peak cylinder pressure, breadth, and timing of combustion within the engine.

11. The control system of claim 8, wherein the fuel injection pulse strategy for the plurality of combustion chambers can each be manipulated independently from one another.

12. A method of implementing a combustion control strategy to alter a torque signature of an engine of an aircraft drive assembly to avoid one or more known resonance frequencies of the aircraft drive assembly during operation, the method comprising:

sensing a rotational speed and torque output of the engine;

sensing a pressure within each of a corresponding plurality of combustion chambers of the engine; analyzing pressure curves within the plurality combustion chambers represented by the pressures sensed within each of the respective plurality of combustion chambers over time;

determining if the engine is operating within an operational range corresponding to the one or more known natural resonance frequencies of the drive assembly;

manipulating a fuel injection pulse strategy of the engine to effect a change in pressure development within the engine during combustion; and implementing the manipulated fuel injection pulse strategy via a plurality of fuel injectors wherein manipulation of the fuel injection pulse strategy alters the shapes of the respective pressure curves to limit excessive pressure development and excessive peak pressure to avoid the one or more know natural resonance frequencies of the drive assembly.

13. The method of claim 12, wherein manipulation of the fuel injection pulse strategy alters at least one of the timing, pulse width, and number of pulses of injected fuel.

14. The method of claim 12, wherein manipulation of the fuel injection pulse strategy affects at least one of a peak cylinder pressure, breadth, and timing of combustion within the engine.

* * * * *

UNITED STATES PATENT AND TRADEMARK OFFICE
CERTIFICATE OF CORRECTION

PATENT NO. : 10,598,119 B2
APPLICATION NO. : 15/422613
DATED : March 24, 2020
INVENTOR(S) : Steven M. Weinzierl et al.

It is certified that error appears in the above-identified patent and that said Letters Patent is hereby corrected as shown below:

In the Claims

Claim 1, Column 17, Line 54:
After "assembly" add ",".

Claim 1, Column 17, Line 62:
After "strategy" add ",".

Claim 1, Column 17, Line 66:
Delete "know" and insert --known--.

Claim 7, Column 18, Line 20:
Delete "and" and insert --an--.

Claim 8, Column 18, Line 46:
After "chambers" insert --,--.

Claim 8, Column 18, Line 54:
After "strategy" add ",".

Claim 8, Column 18, Line 59:
Delete "know" and insert --known--.

Claim 12, Column 19, Line 12:
After "engine;" begin a new paragraph.

Claim 12, Column 20, Line 5:
After "injectors" insert --,--.

Signed and Sealed this
Ninth Day of June, 2020

Andrei Iancu
*Director of the United States Patent and Trademark Office*

Claim 12, Column 20, Line 9:
Delete "know" and insert --known--.